(12) United States Patent
Cook

(10) Patent No.: US 9,751,540 B2
(45) Date of Patent: Sep. 5, 2017

(54) HYBRID SYSTEMS FOR LOCOMOTIVES

(71) Applicant: David Cook, Fullerton, CA (US)

(72) Inventor: David Cook, Fullerton, CA (US)

(73) Assignee: CLEAN TRAIN PROPULSION, Glendora, CA (US)

( * ) Notice: Subject to any disclaimer, the term of this patent is extended or adjusted under 35 U.S.C. 154(b) by 0 days.

(21) Appl. No.: 14/853,905

(22) Filed: Sep. 14, 2015

(65) Prior Publication Data
US 2016/0001799 A1   Jan. 7, 2016

Related U.S. Application Data

(63) Continuation-in-part of application No. 14/217,082, filed on Mar. 17, 2014, now Pat. No. 9,200,554.

(60) Provisional application No. 62/049,651, filed on Sep. 12, 2014, provisional application No. 62/128,296, filed on Mar. 4, 2015, provisional application No. 61/790,771, filed on Mar. 15, 2013.

(51) Int. Cl.
| | | |
|---|---|---|
| *B61H 11/00* | (2006.01) | |
| *B61C 3/00* | (2006.01) | |
| *B61C 17/06* | (2006.01) | |
| *B61C 17/12* | (2006.01) | |
| *F01N 9/00* | (2006.01) | |
| *F01N 3/023* | (2006.01) | |

(52) U.S. Cl.
CPC ............... *B61H 11/00* (2013.01); *B61C 3/00* (2013.01); *B61C 17/06* (2013.01); *B61C 17/12* (2013.01); *F01N 3/023* (2013.01); *F01N 9/002* (2013.01); *F01N 2590/08* (2013.01); *F01N 2590/11* (2013.01); *F01N 2900/08* (2013.01); *Y02T 30/18* (2013.01)

(58) Field of Classification Search
CPC   B61C 17/12; B61C 3/00; B61C 17/06; B61L 3/006; B61L 15/2045; B61L 2200/26; B61H 11/00
USPC .......................................................... 105/61
See application file for complete search history.

(56) References Cited

U.S. PATENT DOCUMENTS

| | | | |
|---|---|---|---|
| 2006/0138285 A1* | 6/2006 | Oleski | B61L 25/025 246/167 R |
| 2008/0148993 A1 | 6/2008 | Mack | |
| 2010/0019103 A1* | 1/2010 | Kane | B61C 17/12 246/186 |
| 2010/0019718 A1* | 1/2010 | Salasoo | B60L 3/0046 320/103 |
| 2014/0277862 A1 | 9/2014 | Pritchard et al. | |

* cited by examiner

*Primary Examiner* — Mark Le
(74) *Attorney, Agent, or Firm* — Richards Patent Law P.C.

(57) ABSTRACT

A locomotive consist includes a first locomotive unit that receives a power command from a throttle signal or a dynamic brake signal from MU trainlines, a second locomotive unit with an energy storage system electrically connected to one or more second unit traction motors, and a hybrid control system on the first locomotive unit. The hybrid control system intercepts the throttle signal or the dynamic brake signal from the MU trainlines, calculates first and second alternate power commands for the first and second locomotive units, respectively, that when added together equal the power command received on the MU trainlines, communicates the first power command to the first locomotive prime engine or dynamic braking system, and communicates the second power command to the second locomotive unit.

20 Claims, 11 Drawing Sheets

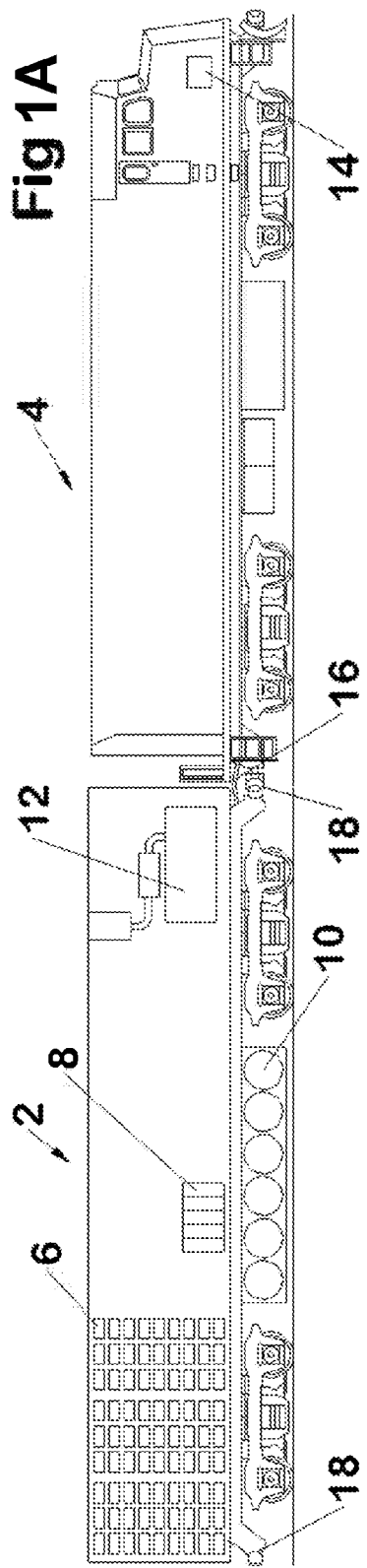

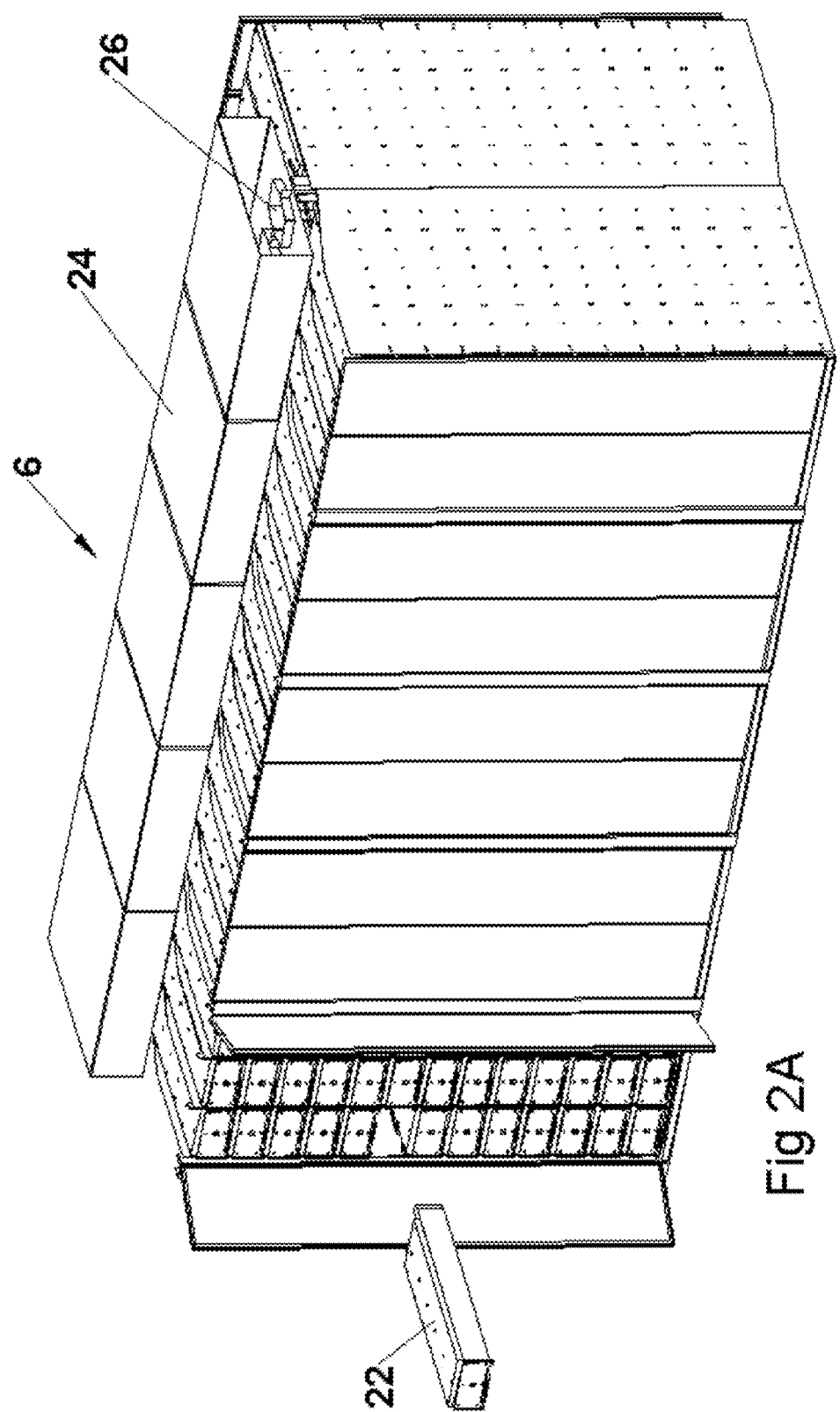

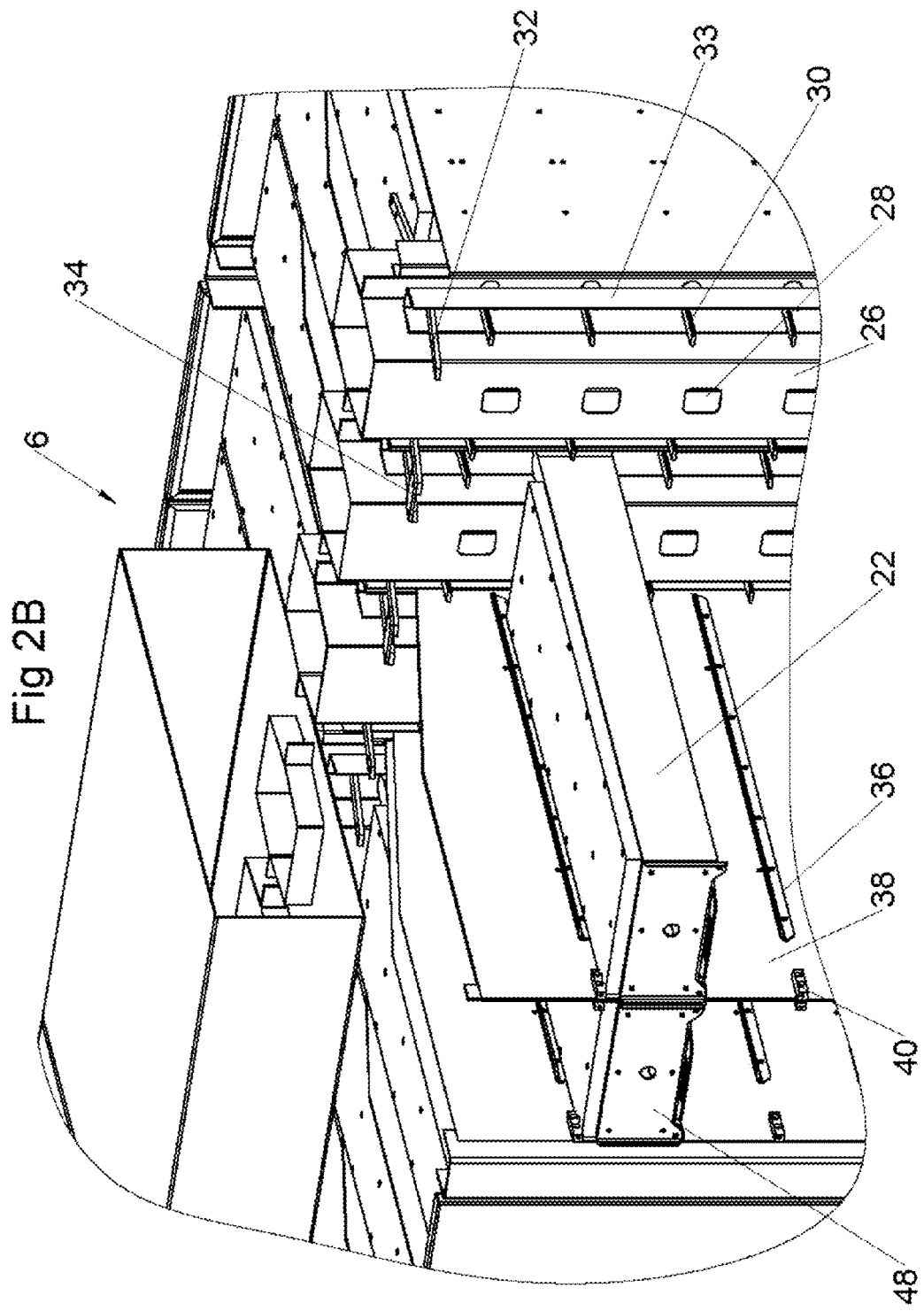

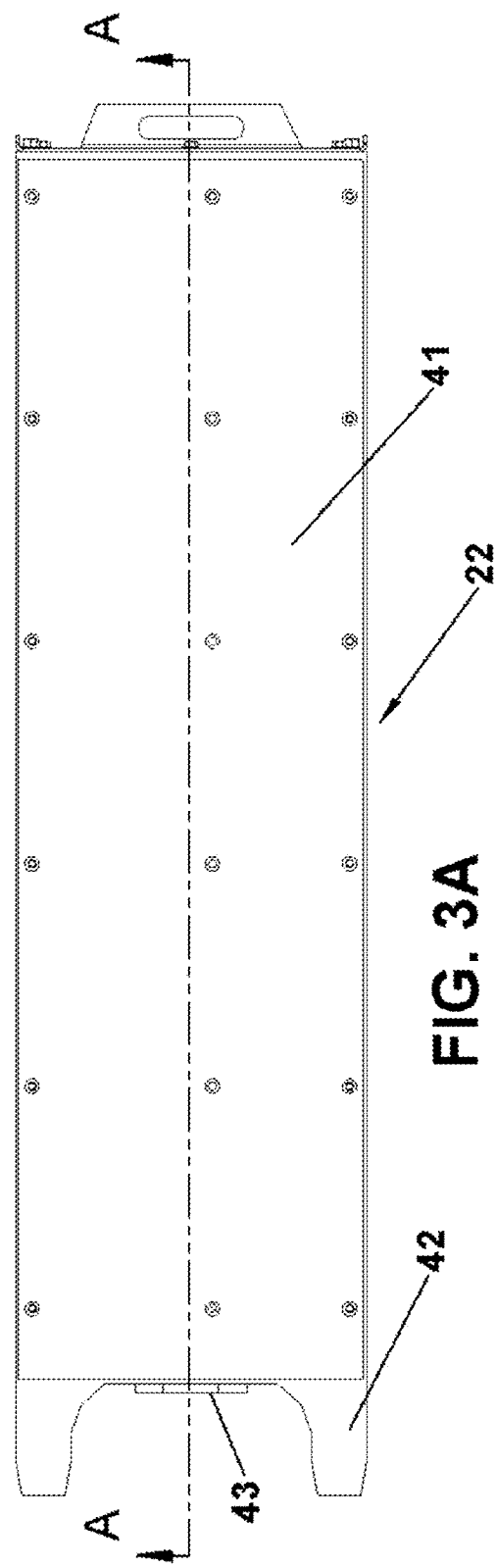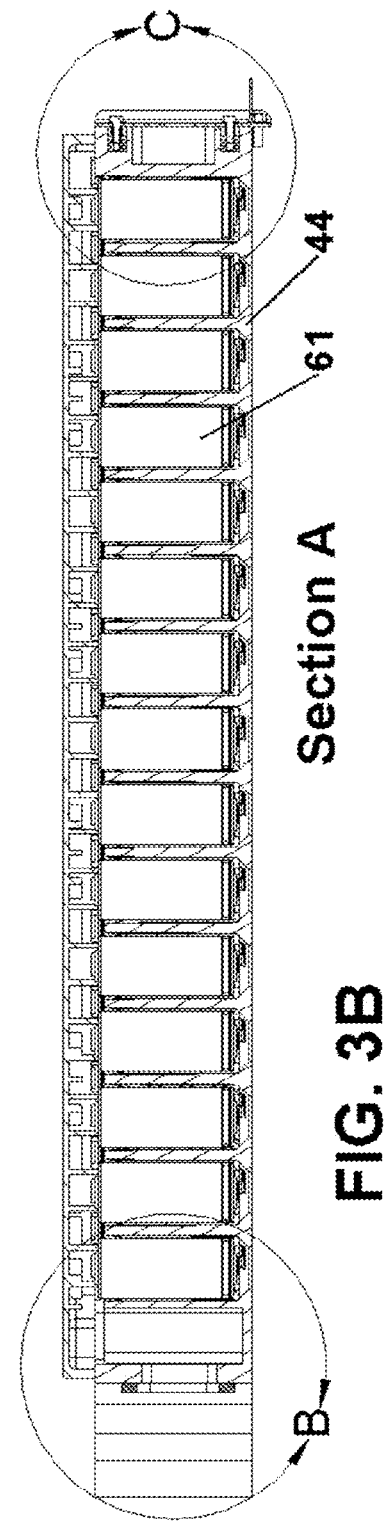
FIG. 3A
FIG. 3B

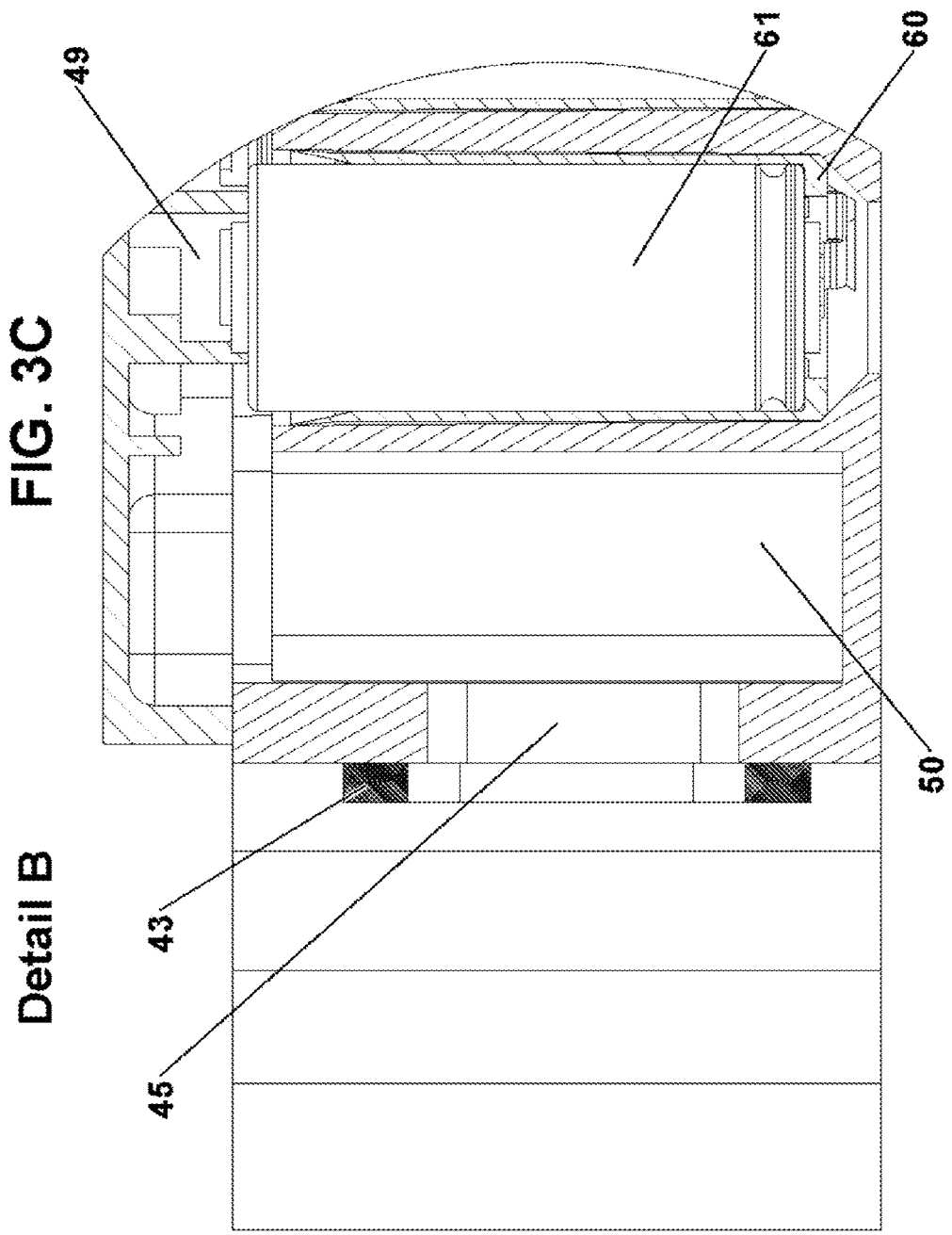

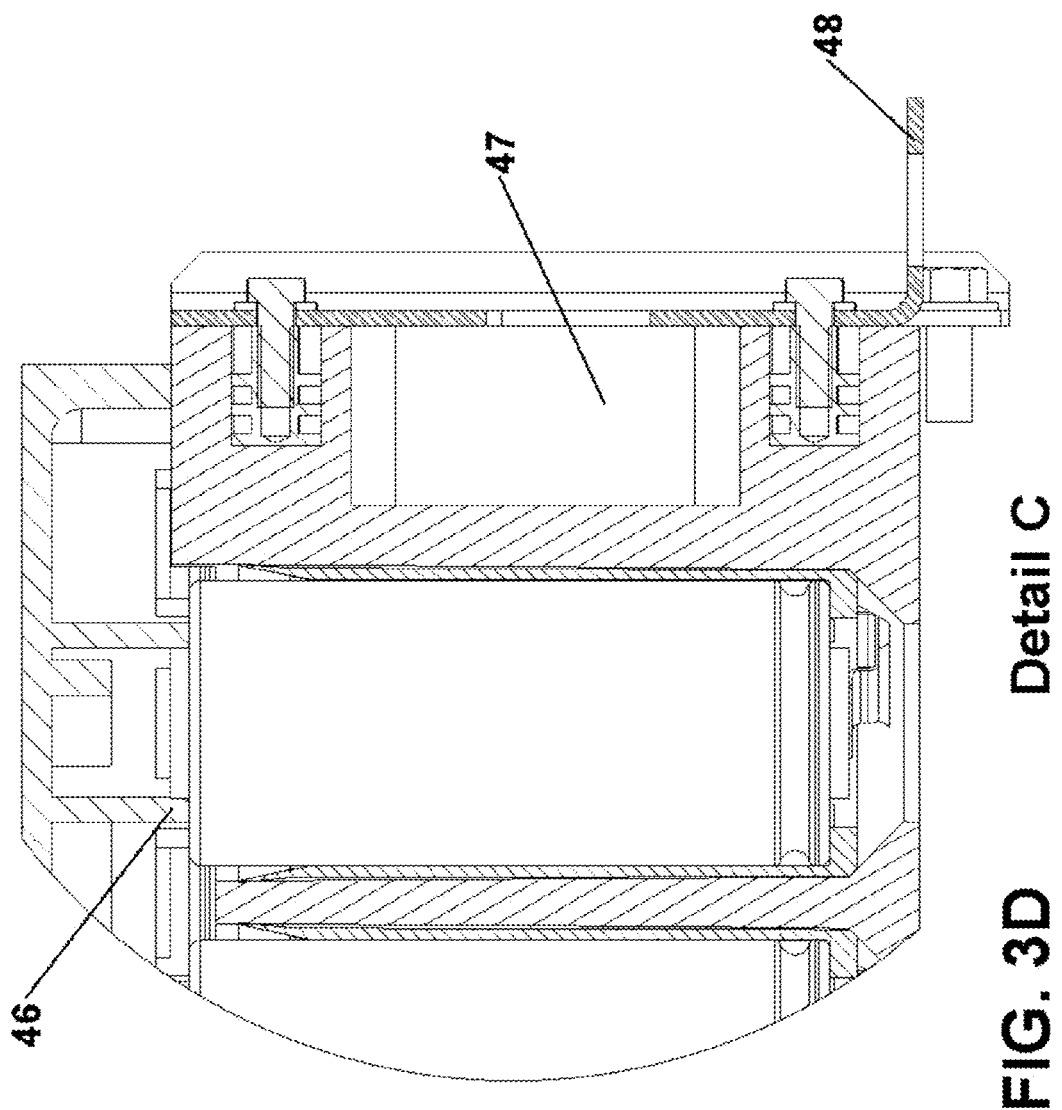

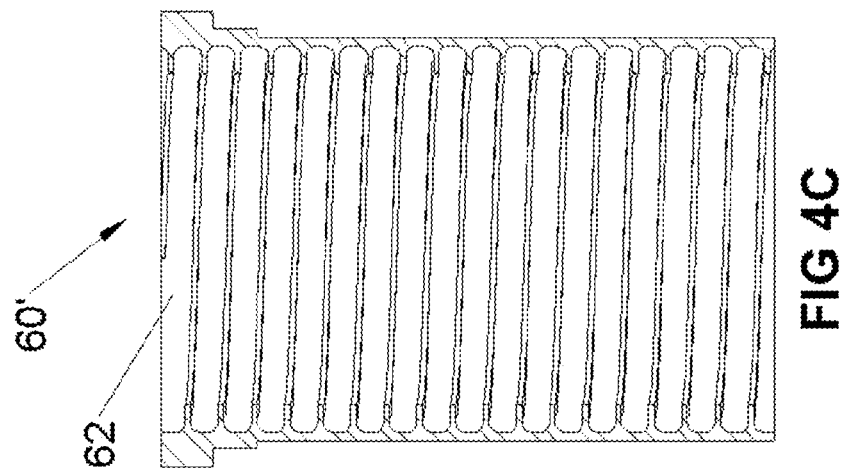
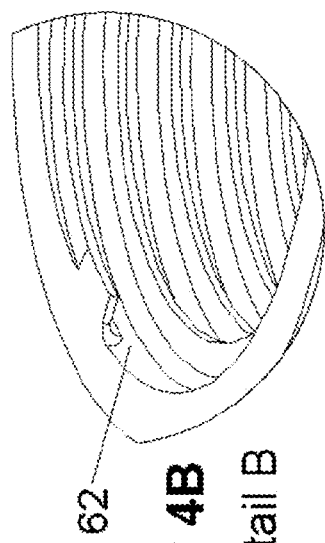
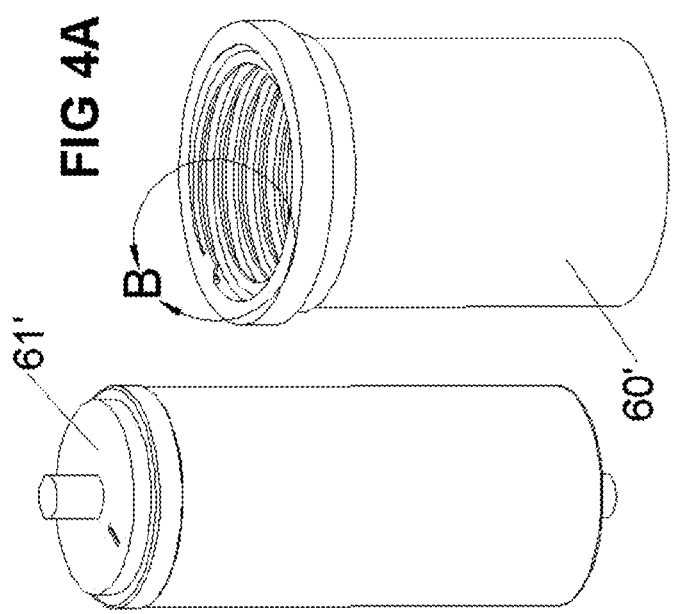

HYBRID SYSTEMS FOR LOCOMOTIVES

CROSS-REFERENCE TO RELATED APPLICATIONS

This application claims the benefit of priority to U.S. Provisional Application No. 62/049,651 filed on Sep. 12, 2014, and U.S. Provisional Application No. 62/128,296, filed Mar. 4, 2015, and is a continuation-in-part of U.S. application Ser. No. 14/217,082, filed Mar. 17, 2014, which claims the benefit of priority to U.S. Provisional Application No. 61/790,771 filed on Mar. 15, 2013, the disclosures of which are incorporated by reference herein.

BACKGROUND OF THE INVENTION

Hybrid Energy Storage Systems (HESS) have been developed and implemented as a means to capture, store and redistribute electrical energy for mobile applications during operation. These systems are normally packaged entirely onboard the vehicle and consist of three major subsystems; energy storage, power electronics and system controls. This diffusers from battery electric systems that require a fixed charging station and can only receive and store a charge of energy when not in operation. Historically a HESS used batteries, commonly Nickel Metal Hydride, but in recent years newer battery technologies such as lithium-ion and other alternatives such as Ultra-Capacitors have also been considered.

The primary challenges for successful implementation of a HESS is to develop a reliable, cost effective, package within a given space claim with sufficient storage capacity, charge discharge rate and intuitive user interface to capture, store and redistribute electrical energy. The electrical energy can be provided to the HESS from any regenerative and non regenerative, on board and external power sources. Current use of HESS is primarily in small to medium size on road vehicle applications such as passenger cars and transit busses where the total energy capture, storage and redistribution of electrical energy is relatively small. For example, a city bus weighs approximately 15 tons and will typically be stopping from a speed of 35 mph or less with approximately 0.5 kW-hrs of kinetic energy that could be captured. Implementation of HESS for typical on road applications that provide drive to the wheels through direct mechanical connection requires significant modification to incorporate as there are no electric motor/generators inherent to the drivetrain.

By comparison, a diesel electric locomotive architecture provides drive to the wheels via electric motors powered by an onboard generator driven by a conventional internal combustion engine. This locomotive architecture allows the existing electric "traction" motors connected to the wheels to be back driven as generators to produce electricity while creating resistive braking energy, known as "regenerative" or "dynamic" braking. Current diesel electric locomotives are able to use dynamic braking to slow the train, but the electrical energy produced is dissipated as heat rather than captured and reused. A typical passenger train with 6 bi-level coach cars will weigh 715 tons and typically stop from a speed of 79 mph. Calculations indicate this train will have 112 kW-hrs of kinetic energy available for capture by regenerative braking. This is over 200 times the kinetic energy of the previously described hybrid transit bus. 200 copies of the existing HESS modules for transit buses would not package well on existing rail equipment and would also not stand up well to the more constant steel wheel on steel rail vibration over the 20 year locomotive service life. This much larger amount of energy to store and discharge in short bursts creates difficult packaging and cooling issues to overcome in order to implement a HESS with sufficient storage capacity and service life for passenger rail applications.

Certain rail applications have unique characteristics that provide excellent opportunity to utilize the benefits of a very large HESS. For rail applications the HESS shall be referred to as a Locomotive Energy Storage System (LESS). The primary application for a LESS is for commuter service due to the frequent start and stop nature, high speed and mass of commuter passenger trains. Switcher locomotives are another application where hybridization would be beneficial due to the frequent start and stopping action of the locomotive as it moves small strings of cars back and forth to build up or take apart longer trains.

In the rail application, large enough HESS will require more space than is available on current locomotives. What is desired is a novel packaging of energy storage, power electronics and a control system interface that decreases the per kW-hr cost while adding system redundancy and reliability. This system should be a direct addition to and backwards compatible with, as much as possible, existing train sets and locomotive control systems. It should also be able to incorporate all types of applicable energy storage technologies, ultra capacitor cells, battery cells, etc., in a modular system with adequate provisions to insure safe, reliable and serviceable operation.

Relevant standards include APTA RP-E-014-99 Recommended Practice for Diesel Electric Passenger Locomotive Blended Brake Control, APTA RP-E-016-99 Recommended Practice for 480 VAC Head End Power System, and APTA RP-E-017-99 Recommended Practice for 27-Point Control and Communication Trainlines for Locomotives and Locomotive-Hauled Equipment (by The American Public Transportation Association, 1666 K Street, N. W. Washington, DC, 20006, USA), each of which is incorporated in its entirety as a reference.

SUMMARY OF THE INVENTION

Described herein is a solution for electric hybridization of exiting conventional diesel electric locomotive powered passenger train and switchyard operations. The solution consists of an additional, all electric, self powered, rail vehicle that coordinates and processes input commands with the primary locomotive to supplement tractive and braking efforts resulting in a rail coupled hybrid locomotive pair. The solution shall be easily incorporated into the operation of existing trains though existing control and power wiring with little to no changes to equipment or infrastructure and be a scalable platform to allow inclusion of new energy sources and technologies though specific upgrades to the additional rail vehicle.

The Hybrid Locomotive Pair will be disclosed that consists of a conventional diesel electric locomotive A unit and the all electric, self powered, rail vehicle B unit. The existing conventional locomotive controlling as an A unit locomotive provides the primary motive force for the train. The A unit consists of a conventional locomotive frame, operators cab, traction motor trucks, and internal combustion engines coupled to generators that provide the propulsion energy required during the periods were the train or switcher set is operating at a constant speed for a long distance. The B unit is either coupled to or on the opposite end of the train from the A unit and is connected through existing train wiring architecture as further disclosed in this submittal. The B unit is a Zero Emission Boost Locomotive (ZEBL) having its own set of powered traction motors for accelerating and decelerating the train. The ZEBL is equipped with a LESS that allows it to supplement the tractive and braking capability of the A unit through capturing, storing and releasing energy from external sources independent of the A units prime mover such as the train deceleration regenerative braking. The hybrid locomotive pair is controlled in a similar fashion to existing A-B locomotive unit controls with the A unit receiving input commands from the operator which are also received, processed and transmitted to the B unit though the Hybrid Control interface Box (HCIB) which is mounted in the A unit's control cab and connected to the B unit through the trains existing MU command wiring.

The Hybrid Locomotive Pair will have several benefits. The additional power of the ZEBL will accelerate current length trains more quickly or allow longer trains to accelerate at the same rate without the need for a bigger diesel engine in the locomotive or additional conventional locomotives to be added. The ZEBL will also reduce overall fuel consumption, criteria emissions and GHG emissions. In advanced systems it will also promote the installation of smaller more efficient engines in locomotives without sacrificing performance.

Further the ZEBL will reduce the amount of brake disc and pad wear on the air braking systems for the rail passenger cars which will reduce cost in materials and maintenance.

Passenger train hybridization will also improve the commuter rail service by encouraging the railroad to stop more often at shorter distances without paying a penalty in increased fuel usage or significant travel delay. As commuter rail agencies build up, they tend to add more stops between existing stops, this technology reduces both the schedule and fuel penalty of these additional stops. Because this technology lowers fuel operating cost while increasing performance, it may become a disruptive technology accelerating the growth of existing commuter agencies by simultaneously allowing lower fares and higher service frequency.

Utilizing the additional space allowed by the B unit ZEBL as an advanced locomotive energy storage platform allows for future upgrades and performance enhancements for the train such as ram air cooling, waste heat recovery and water injection to further reduce the greenhouse gases and increase the performance of trains equipped with these locomotive systems.

A hybrid control interface box (HCIB) will be disclosed that allows a ZEBL to be coupled to a standard diesel electric locomotive. The only modification needed to the standard locomotive to be used as control locomotive would be the installation of the HCIB. Because train hybridization can be done with such a minor modification to existing equipment, it may accelerate the transition of all commuter fleets. Making the HCIB control system fully backwards compatible with the conventional locomotive control system would eliminate the need for modifying the cab cars that operate at the other end of the passenger trains. If this is accomplished the hybrid pair of the ZEBL and control locomotive could be MU connected to and controlled by any other locomotive or cab car.

Several techniques of modifying existing locomotive control responses and systems will be disclosed allowing control of hybrid locomotive systems for both passenger rail and switcher service. These include features of constant acceleration and deceleration control for simplified engineer control of regenerative braking and boosted acceleration. Optionally there are configuration modification control features to delay using the stored energy in a hybrid switcher system or accelerate the use of stored hybrid energy in passenger train on shorter stop segments.

In addition to the HCIB, proposed will be a simple and clear indicating system for the engineer that allows optimizing of the regenerative energy capture under different track conditions and train weight.

A novel use of existing passenger train HEP cables will be disclosed that allow the advantages of pre-charging the LESS from wayside power or on board HEP or secondary generator. In addition integration of the HEP cable power system into the ZEBL LESS power electronics allows a ZEBL to provide a limp home capability in the case of either the prime engine or HEP generator engine failure.

A modular LESS will be disclosed with several novel packaging concepts combined with a novel electrical bussing and control system to both drive down the module and module rack system cost while offering a robust and redundant system applicable to railroad service.

Also to be disclosed is a simple, low cost forced air cooling system for the LESS. The cooling system will provide each energy cell within a group or module with its own supply of cooling air to minimize cell temperatures and maximize the system voltage for the highest energy density and UC cell durability. An optional spiral groove is placed around each cell to insure evenly distributed cooling air flow between all cells on the same duct system and better utilization of each mass unit of cooling air. The increased cooling air utilization allows smaller ducting and corresponding higher number of UC cells in each UC cell module.

An intermediate bus bar system will be disclosed to allow parallel and series interconnect of modules with any one module failure not affecting other modules in its series string. Optionally, each UC cell module assembly could contain UC cells, a DC contactor plus the cell balancing electronics and a module controller. Each UC module can be removed with a minimal amount of fasteners and only a low voltage circular connector to be manually disconnected.

DESCRIPTION OF THE DRAWINGS

FIG. 1A: F40 Passenger Locomotive with hybrid B unit including optional HEP generator and CNG tanks installed on B unit.

FIG. 2A: An Isometric view illustrating 6 cabinet sections of a LESS system with integral cooling on a B unit with optional HEP generator and CNG storage FIG. 2B: A cut away view of part of the LESS from FIG. 2A with many parts removed for clarity FIG. 3A: A top view of a single UC cell module assay.

FIG. 3B: A side cross section view of FIG. 3A showing some internal details of the UC cell module assembly.

FIG. 3C: Detail View B from FIG. 3B with a close up view of the rear section of a UC cell module assembly where the UC module assembly connects to the electric bus bars and vertical cooling air duct.

FIG. 3D: Detail View C from FIG. 3B with a close up view of the front section of a UC cell module assembly where the UC module is retained in the racking system and the low voltage control module and communications plug is connected.

FIG. 4A: An isometric view of a typical UC cell and a UC air cell cooling sleeve with a spiral shaped cooling air passage.

FIG. 4B: Detail View B from FIG. 4A illustrating the inlet area to the spiral shaped cooling air passage FIG. 4C: Cross section view of a UC cell air cooling sleeve further illustrating the spiral shaped cooling air passage

DETAILED DESCRIPTION OF THE INVENTION

Figure 1B:
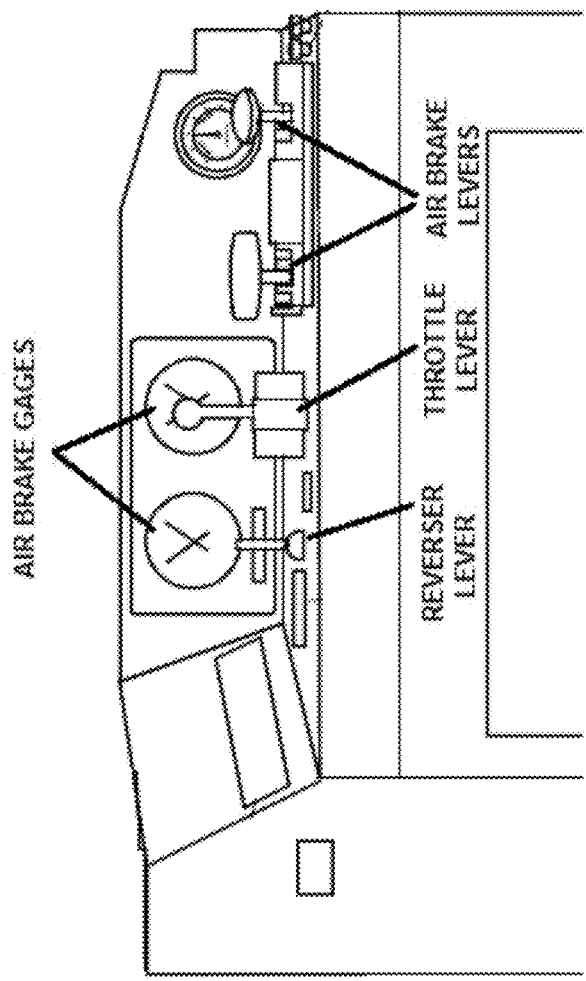
FIG. 1B: Prior Art drawing of locomotive control console illustrating throttle control next to air brake control with air brake guages

To facilitate an understanding of the present disclosure, a number of terms and phrases are defined below:

'A-B' Unit: During the transition from steam power to diesel power in the railroad industry, the early diesel locomotives were less powerful than steam locomotives, and the diesel engines were less efficient and less reliable than current medium speed diesel engines. Because of this, it was rare to have a single diesel powered locomotive in a consist. It was so common to have additional locomotives in train consists that many locomotives were produced without an operators cab. These locomotives were called 'B' units, and the locomotives they were connected to would be referred to as an A unit. In conventional practice an A unit could be capable of independent operation without an attending 'B' unit, or some A units could be specially designed to be dependent on a supporting 'B' unit.

Auxiliary Power Unit (APU): When a conventional diesel electric passenger locomotive system is converted to a hybridized system, what was the HEP generator can now be called an Auxiliary Power Unit. This APU will typically be less than half the size of the larger locomotive "prime mover" engine, potentially 500 to 900 kW in size. When the locomotive is in service this engine will at a moderate load continuously with the larger locomotive engine only be turned on or loaded for acceleration events. This name change is due to the functional difference between a HEP generator and the APU. A typical HEP generator only supplies hotel power to the passenger cars. In a hybrid passenger train the APU can supply power to not only the passenger cars, but also to the traction motors and the hybrid energy storage system. The hotel power is generated by a static inverter that is powered off of a common DC power bus. This common DC power bus electrically connects the hybrid energy storage system, the large locomotive engine and the APU which are the three possible power sources on the locomotive. The traction motors also get their power from the common DC power bus so that any one or more of the three power sources can be the supply of propulsion or hotel power. Further the hybrid energy storage system can be charged by any one or more of the traction motors, large locomotive engine or the APU.

Alternative Fuel Tank: A cylinder, group of cylinders, tank or enclosure that can contain compressed or liquid natural gas, hydrogen or other liquefied or gaseous alternative fuel 'B' Unit: See 'A-B' Unit:

Cab car: A cab car defines a rail car used at the opposite end of a passenger train from the locomotive. It will be equipped with a locomotive control system so that the train engineer can operate the passenger train with the locomotive at the rear in a push configuration. Cab cars are sometimes standard passenger cars with an area set aside for the engineer. Sometimes they can be an old locomotive with the diesel engine and traction motors removed also known as a Cab Control Unit (CCU).

Consist: See Train Set

Head End Power (HEP): A system by which 480 VAC 3-phase electrical power, to operate auxiliaries, is provided to railroad vehicles from a central source via a trainline system. The power source can be locomotive (hence "Head End"), power car, or wayside source. passenger locomotives need hotel power for the passenger car climate control and lights. This is typically provided by a second diesel generator on a locomotive that outputs 480 volts AC at 60 Hertz in the united states, in Canada and Europe HEP power may be provided at a different voltage and frequency such as 575 volts and 50 HZ. This power could be provided by an engine running on any alternative fuel or a fuel cell. In some locomotives a second engine is not used, and the hotel power is generated by the prime engine which propels the locomotive. This can be done by using a second generator attached to the main engine, or with a static inverter that takes electrical power from the traction alternator or generator and converts that to the appropriate voltage and frequency for hotel power. In this document hotel power will commonly be referred to as HEP HEP jumper cable: A HEP jumper cable is a cable assembly, having the necessary power and control conductors and equipped with a plug on one or both ends, which is used to provide a flexible electrical connection between two cars and/or locomotives or wayside equipment.

HEP Trainlines: In order to transmit HEP power from the locomotive containing the HEP generator to the passenger coaches or other locomotives in the train, a set of high voltage wires and plugs is used. The HEP trainline is an electrical cable system which allows HEP to be transmitted over the entire length of a train. It includes both power and control conductors. The trainline may provide power to equipment in each vehicle, or may simply pass straight through, providing a power path between vehicles on opposite ends of that vehicle. Typical passenger trains in North America have four sets of HEP trainlines that run through each locomotive and each passenger car. Typically two jumper cables are used on each side of a locomotive or passenger car to connect the HEP trainlines of the two vehicles. Each HEP trainline set is made up of 3 isolated large conductors and 3 small conductors. The small conductors are used to sense if the trainline is 'complete'. If one of the HEP cables would start to fall out of its receptacle, the small wire contacts would become open. The HEP system would detect this opening of the circuit determining that the trainline is not 'complete', and then turn off the main AC contactor for that set of wires. The larger conductors are typically 4/0 wire, and between the four sets of cables, there is the capacity to transmit approximately 1.4 MW of power.

In this document HEP trainlines can also be referred to as HEP cables.

Hybrid Regenerative Braking (HRB): Most passenger and line haul locomotives are equipped with dynamic brake systems that can decelerate the locomotive or maintain a constant speed on a downhill grade by using the fraction motors are generators and dissipating the regenerated energy through air cooled resister grids. For Hybrid locomotives, this regenerated energy is diverted from the resistor grid to a LESS. This captured and stored energy is later used to propel the train causing a reduction of fuel use. The act of using Dynamic brake and capturing the energy in a LESS is hereafter referred to at Hybrid Regenerative Braking (HRB)

Locomotive Energy Storage System (LESS): Energy storage system used in rail service for hybridizing a locomotive or train consist. This energy can be stored as kinetic energy in a mechanical flywheel or electrical energy in a battery or capacitor. LESS systems have also been referred to as a Hybrid Energy Storage Systems (HESS). HESS systems have been referred to in many mobile application most commonly in Hybrid transit bus systems.

Train Set: a group of 1 or more rail cars pulled by one or more locomotives, also known as a consist.

Locomotive Fuel Optimizer (LFO): Is a device manufactured by Quantum, now Invensys for manipulating throttle controls in consists of multiple locomotives. All locomotives in a consist share the throttle signal from the lead locomotive across a locomotive to locomotive control signal trainline called an MU cable. The LFO is installed in each locomotive and intercepts the throttle control signal on the MU trainline cable before it goes to the engine control in each locomotive. Without an LFO system all the locomotives would be at the same throttle position that the engineer commands in the lead locomotive. An LFO system is implemented to run the locomotives with the highest fuel efficiency at the highest power setting while the lower efficiency units operate at reduced power or idle. With an LFO system, when the engineer selects a throttle position less than notch 8 (full throttle), the LFO will perform calculations and determine which engines should remain at high power and which should be throttle back. At all times the combined power output of the locomotives will be close to what the engineer requested with the throttle lever, but the LFO system manipulates the individual throttles to save fuel by operating the most efficient engines at the highest power setting. When an LFO is not active, the locomotive will respond to throttle inputs as if the LFO was not installed.

MU Trainlines: The control systems and interconnection capabilities have been standardized in the railroad industry over the last several decades. There are now more than 24,000 locomotives operating in North America manufactured by over 6 different companies that can all be interconnected by a 27 point MU cable. This system is built upon a set of 27 MU trainline conductors that run from end to end of every locomotive to MU receptacles at each end of the locomotive. The connecting of two locomotives to operate together only requires the use of an MU jumper cable connecting both locomotives. The 8 notches of throttle power are controlled by a high or low signal on four different wires (3,7,12,15) in the MU 27 point trainline set. In all diesel electric locomotives manufactured from the 1950 up through today, the mechanical throttle lever in each operators cab is directly wired to these four MU trainlines. For this reason there is a mechanical interlock in every locomotive that locks the throttle lever in the idle notch when the forward and reverse lever is removed from the control stand. The practice of removing this forward and reverse lever is what prevents the throttle controllers in multiple operator cabs from interfering with each other. The engine controller in each locomotive is also directly wired to the MU trainlines passing through, it is the fact that the LFO or HCIB control box can intercept the 4 high or low signal wires between the MU trainlines and the engine control that allows these retrofit control systems to operate regardless of the age of the locomotive or the complexity of its engine control. The LFO or HCIB will determine the engineers requested throttle setting by monitoring the MU trainlines and either pass that signal or an alternate signal to the engine controller. his is similar for the dynamic brake control signal which is an infinitely variable 0-72 volt DC signal on trainline 24 is used to indicate the amount of dynamic braking effort requested by the engineer. Again the LFO or HCIB system only needs to intercept this signal to capture the engineer's intent and then send an alternate signal to the locomotive dynamic brake controller. AAR S-512-1994, 27-Point Control Plug and Receptacle Stand by the American Association of Railroads covers this topic.

Wayside Power: Also commonly referred to as shore power. There is a trend in many industries to connect mobile pieces of equipment to stationary power sources when not in service to reduce the emissions from idling engines. Shore power likely comes from the use of this technology for ships at port. It is now being implemented as wayside power in trucks at truck stops and also locomotives. In the case of passenger locomotives, implementation of wayside power is relatively easy through the HEP cable system. Wayside power can be connected to a stationary passenger locomotive by connecting it to an appropriate power panel located near the end of the parked train using HEP jumper cables. This is similar to connecting to another rail car.

UC Cells: Ultra capacitor systems are usually built up from individual cells joined in series for higher voltage capacity and also joined in parallel for higher current capacity, UC cells and battery cells can be manufactured in either prismatic shapes or cylinders. In this document, when a UC cell is discussed, it could also be replaced with a similar battery cell and may be either cylindrical or prismatic unless defined in context.

The first portion of the detailed description relates to a Hybrid Pair of locomotives that would be incorporated into a passenger train. The Zero Emissions Boost Locomotive (ZEBL) is a integral part of the Hybrid Locomotive Pair, it is a supplemental locomotive platform containing its own traction motors but configured with a LESS in place of the main engine, generator and related subsystems.

When a ZEBL is implemented, the conventional locomotive that it is connected to is typically referred to as a 'control locomotive' or A unit. In the preferred embodiment a ZEBL is similar in function to a traditional B-unit locomotive where it has its own power source and traction motors but does not typically have its own control cab. In the event that a ZEBL is also used as a CCU for push-pull operation of a passenger train then the ZEBL may have an operators cab.

In this document the terms B-unit and ZEBL can be used interchangeably. Also A-unit and Control Locomotive are used interchangeably.

FIG. 1A is a side view of the preferred embodiment of the Hybrid Locomotive Pair depicting a typical passenger locomotive, A unit 4 with a B unit 2 connected. Installed on B unit 2 is a locomotive energy storage system LESS 6 composed of energy storage (batteries or ultra capacitors) in a rack assembly. B unit 2 also has a set of power electronics 8 that will control the flow of energy between LESS 6 and the traction motors in B unit 2. A unit 4 is a conventional passenger locomotive fitted with a Hybrid Control Interface Box, HCIB 14.

The B units may store additional fuel as well, thereby allowing the railroad to convert to an alternative fuel without diminishing the range of the train. In some cases the fuel use reduction of hybridization along with the additional fuel carried on the B unit will actually extend the operating range of a train. One embodiment is a dual fuel locomotive system where the control locomotive will still carry the diesel fuel and the ZEBL may have the CNG tanks Dedicated natural gas control locomotives may extend their range when connected to a ZEBL by having CNG cylinders onboard both the control locomotive and the ZEBL.

Additionally the B unit may be equipped with Crash Energy Management (CEM) features such as pushback couplings which may extend the operational service life of older locomotives as the B unit could have additional CEM capability to offset the lack of a pushback couplings or other CEM features on the A unit locomotive.

The B unit may have provisions for its own HEP generator and fuel supply. Adding the HEP generator allows the B unit to take over some functions that were previously performed on the A unit such as transferring waste heat to the atmosphere remotely from the fossil fuel engines on the A unit. In another embodiment, the brake compressor can be moved from the A unit to the B unit to free up additional space in the A unit for a bigger HEP, APU or a waste heat recovery system.

The B unit 2 is also equipped with three optional features. First is an optional Head End Power generator, HEP 12. HEP 12 may serve several functions. In fleets that use older F40PH locomotives, it was common to not have an independent HEP generator on these units. These particular locomotives were known in the industry as 'Screamers' because the main locomotive engine had to operate at maximum RPM any time that the HEP generator system was providing hotel power to the coaches. This would mean the locomotive would come to a complete stop at the station yet the engine would still be at full RPM. This not only made excessive noise at the station platform where people were standing, but the engines were very inefficient at this high RPM and low load. It also reduced the continuous propulsion power that the locomotive could put out because some of the engines output had to be used to provide hotel power. In this case, the addition of HEP 12 to B unit 2 solves several problems for single engine passenger locomotives; its quieter, more efficient, less polluting and the locomotive is now capable of more continuous propulsion power.

The second optional feature added to B unit 2 is the set of Alternate Fuel Tanks 10. In this case, even a diesel fueled A unit locomotive could be partially converted to CNG by using CNG fuel to power the HEP 12. In some cases a commuter locomotive may consume ⅓ of its fuel producing hotel power to heat, cool and vent the passenger coaches. As these trains are hybridized, the proportion of energy used for HEP power will increase as hybridization reduces the amount of energy used for propulsion. On very short segments, the energy needed for locomotive propulsion can be reduced by 40%. Because CNG storage requires at least 6 times the storage volume as diesel fuel it is impractical to convert commuter locomotives to CNG fuel. It is the combination of reduced fuel consumption due to hybridization and the addition of this extra fuel storage space under B unit 2 that makes conversion of commuter rail to CNG fuel now practical without requiring multiple refueling events every day.

The third optional features added to B unit 2 are Crash Energy Management features. In FIG. 1A these are shown as pushback couplings CEM 18 installed at each end of B unit 2. It is currently impractical to modify a standard locomotive frame to accept pushback couplings and these are currently only designed into new locomotives. Having this feature may allow the commuter railroads to safely keep their older F40 and F59 passenger locomotives in service for several more decades by adding extra energy absorption to the B unit to make up for the lack of CEM energy absorption in the A unit locomotive it may be connected to. With the CEM integrated into the B unit, it reduces the concern of the heavy locomotive without CEM pushing a train because the B unit itself may have more total CEM energy absorption than required for a combined A and B unit when both are equipped to meet modern CEM standards. These pushback couplings and anti-climbers can be installed for CEM in all of the B unit designs in this document. It is illustrated and described in FIG. 1A that the CEM 18 feature is provided by pushback couplings, it is known in the art that CEM capability can be added by pushback couplers, pushback anti-climbers and also deformable structures at each end of the B unit 2 frame and body.

FIG. 1A also has a set of cables 16 that couple the A unit 4 to B unit 2 to transfer power. Cables 16 on a conventional passenger locomotive would contain a set of cables that would transfer hotel power from the locomotive to the passenger coaches in the train, these are typically referred to as HEP cables. In an alternate embodiment, Cables 16 could also be used to transfer excess dynamic braking energy from F40PH4 to B unit 2.

In an advanced embodiment, cables 16 would become the link between the common DC buses on both the B unit 2 and A unit 4. In this advanced embodiment it is possible to transfer regenerative braking energy from the A unit 4 traction motors through the common DC power bus to the LESS 6 on B unit 2. Doing this would access all 8 fraction motors that can be fully utilized to perform regenerative braking. This allows the train to slow down significantly faster at high speeds than a train just using the 4 traction motors installed in B unit 2.

The second portion of the detailed description relates to a hybrid control interface box, HCIB 14 and its functional embodiments.

Previously discussed has been the B unit 2 that houses the LESS 6 and A unit 2 that has HCIB 14 installed. The HCIB 14 interprets the engineers throttle commands for acceleration and cruising and blends power from both the diesel engine in A unit 2 and the LESS 6 to produce the requested power. When the engineer manipulates the controls to decelerate the train, the HCIB 14 will have to blend the standard passenger train dynamic braking system with the B unit 2 power electronics 8. When the LESS 6 is not full of stored energy, the B unit 2 power electronics 8 will use the B unit 2 fraction motors as generators and decelerate the train by transferring electric energy into the LESS 6.

Figure 1C:
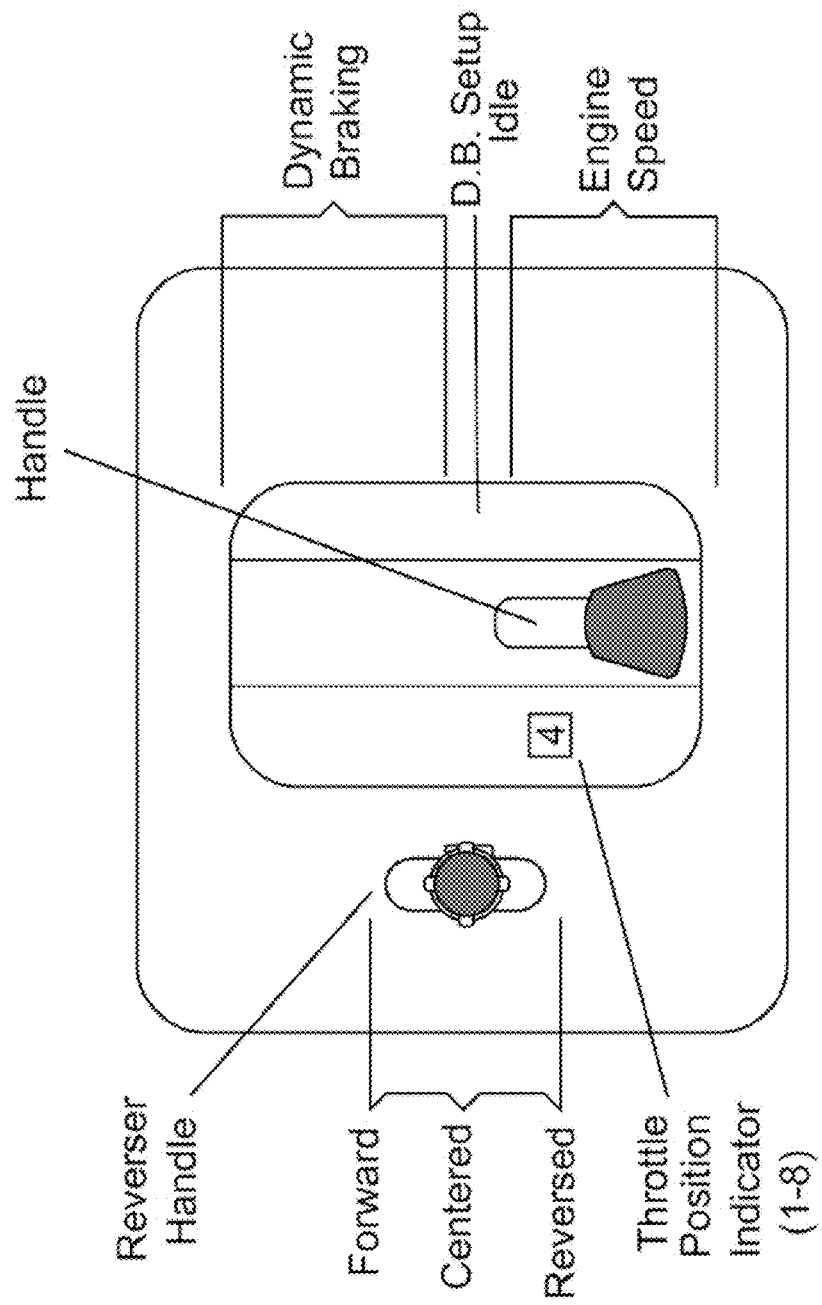
FIG. 1C: Prior Art drawing of locomotive combined throttle and dynamic brake lever controller illustration throttle and dynamic brake control region

FIG. 1B illustrates a standard passenger locomotive control console illustrating how the throttle lever is independent from both of the air brake control levers. FIG. 1C is a tip view of the throttle lever illustrating how a single lever controls both the engine throttle in the bottom range and the dynamic brakes in the top range.

In one embodiment HCIB 14 will intercept the engineers throttle and dynamic brake control inputs and then calculate a new throttle and dynamic brake setting for A unit 4 while also communicating to power electronics 8 the appropriate signals so that the train produces the requested tractive power output commanded by the engineer.

In early embodiments the HCIB 14 unit will be added to the standard locomotive acting as the A unit. In future embodiments, the functionality of HCIB 14 could be incorporated into the locomotive control system which would eliminate the need for a separate HCIB 14. The HCIB 14 would intercept and manipulate the locomotive throttle signals in a manner similar to an LFO (see definitions). In addition to the LFO throttle intercept concept, this system will also intercept and manipulate the dynamic braking control signals. In the instances where there are more than 2 HCIB 14's because there is a second locomotive in the consist, then the HCIB 14 system will have to use the combined power of the two locomotives in its calculations to balance the power output of the two locomotives and the B unit 2.

In its simplest form the HCIB 14 could intercept and manipulate the throttle signal and the dynamic brake handle signal. With the current APTA standard RP-E-014-99 for passenger locomotive blended brake control, standard practice is to use the automatic braking handle for decelerating the train. Under blended brake guidelines, whenever the automatic brake handle is moved to give at least 5 psi of brake control pressure, the blended brake controller automatically mixes dynamic and air braking with an emphasis on using the as much dynamic braking force as possible. Also part of the standard is that any motion of the manual dynamic brake handle takes the controller out of blended braking and at that point the automatic brake handle simply controls the air brakes of the train as if the blended brake system did not exist or was turned off.

Now that blended braking has been deactivated the engineer can control the rate of deceleration with the dynamic brake handle. Dynamic brake systems with DC traction motors stop functioning below approximately 10 mph. With the automatic brake handle already at the 5 psi setting, the engineer can start applying the automatic train brakes at speeds below 10 mph as he moves the dynamic brake handle back to the off position and the train smoothly comes to a complete stop using the air brakes.

This described control scheme allows the standard passenger locomotive braking control system to remain completely unchanged so normal inputs operate the locomotive per the APTA standard. By using the dynamic brake lever activated cutout specified in the blended brake standard we could integrate a hybrid control scheme on top of the conventional blended brake standard. To utilize the hybrid system the train engineer only needs to set the automatic brakes to 5 or 10 psi as normally done, and then start applying the dynamic brake handle instead of adding more automatic brake pressure. The system will automatically turn over the dynamic brake control from the blended brake controller to the dynamic brake handle. Because the HCIB 14 intercepts the dynamic brake handle signals it can now manipulate both the passenger locomotives dynamic braking system and the hybrid B units power electronics to charge up the hybrid energy storage system as it decelerates the train. If for any reason the engineer feels the need to use the standard train air brakes, they are already preloaded and he only needs to increase the pressure by further applying the automatic brake lever.

Not only is the proven and safe standard blended braking system retained as is, the engineer does not need significant training or practice to operate a hybridized train with this system. If an event occurs and the engineer responds to standard operating practices, the automatic brake handle stops the train just as it would in a standard locomotive system.

After these systems have been in development it is likely that the APTA standard will get revised and a hybrid control element would get incorporated into it. At that time a separate HCIB 14 won't be needed and its functionality will be incorporated into the locomotive control system. In the meantime this overlaid hybrid control scheme can be implemented without modifying the existing hardware.

With the incorporation of a LESS, the amount of power available to accelerate and decelerate the passenger train is significantly more than the rated power of the diesel engine. The power limit now is no longer the maximum power of the propulsion engine, but the power capacity of the traction motors. Typical DC traction motors are current limited and are rated for a nominal power at a low speed. 10 or 15 mph in some cases, and in the past this was all the information that was needed as the traction motors has to be able to accept the full rated power of the diesel engine at this low speed as heavy trains ascending long grades would need to operate at these low speeds.

As a DC traction motors speed increases its operating voltage increases. An electric motors power capacity is limited by how much internally generated heat that it can withstand. The internal heat generated by an electric motor is more a function of the current flowing through it than the voltage applied to it. At 10 mph where a traction motor may be rated at 380 kW, it may be operating at 400 volts DC and its maximum current of 1050 amps. At 79 mph that same traction motor is operating at 1300 volts and now has a much lower current around 300 amps which is still around 400 kW of power. But the electric motor is still limited by current to 1050 amps. The motor that is rated for only 400 kW at 15 mph, may theoretically be capable of 1458 kW at 79 mph. Lightly modified locomotive traction motors are commonly used in other applications at constant higher RPM at over 1000 hp continuous.

With this in mind a modified scheme should be developed for operating hybrid passenger locomotives that allows this increased power capability at higher speeds to be utilized. One way to do this is with a secondary input, possibly a momentary button or a pedal. This could be the 'boost' switch. When boost switch is active and the throttle is at notch 8, the hybrid control system should increase the combined power output of the engine and hybrid energy storage system to maintain a preprogrammed acceleration rate. This rate would be a safe rate that would not unsettle passengers. The hybrid control system would maintain this acceleration rate until the train had accelerated fast enough that the programmed acceleration rate required more energy than is safe to put through the traction motors or is available from the engine and LESS combined. Whenever the engineer releases the boost switch or pedal the notch 8 power output would go back to standard rated notch 8 power. Instead of a separate boost input, the control system could be designed to do this automatically in notch 8. Meaning that notches 1 thru 7 would be calibrated to the nominal notch settings for the rated control locomotive power (typically 3000 HP), and that notch 8 would put out at least the typical rated notch 8 power from the combined control locomotive and ZEBL, but if the acceleration rate was less than the programmed rate, the hybrid control system would start to increase the power available, similar to how the boost input would work.

Another way to have the engineer control when the train is in acceleration rate control is to combine both previous systems. The throttle lever could have the standard 8 notches and then a momentary notch 9 that is spring loaded to push back into notch 8 when the engineer releases the lever. In this embodiment, when the engineer stops pressing the lever against the 'Notch 9' spring, the control system will leave 'boost' mode and revert back to rated notch 8 power. Or notch 9 could not be momentary, but an additional notch where the throttle will remain when placed there. The down side of these embodiments is that are not fully backwards compatible with the existing MU cabling system and any cab car or other locomotive in the consist would need this special notch 9 setting, throttle spring feature and switch to sense the 'past notch 8' position.

One previous embodiment discussed using a spring detent past notch 8 to put the locomotive in constant acceleration rate mode. Another embodiment was to make the first 7 notches standard, and then the 8th notch a constant acceleration rate setting.

The preferred embodiment would be to utilize the appropriate control system programming so that the 8th notch could be both notch 8 power level and constant acceleration rate depending on the conditions leading up to the notch 8 setting. Under normal circumstances in a passenger locomotive the throttle lever will set the notch 8 position to constant acceleration rate. In some cases the train engineer may need to maintain a constant speed up a slight grade by moving the lever back and forth between notch 7 and 8, in this case you would want the throttle lever to command a set power level.

To allow this feature the system will be programmed that upon first achieving notch 8 in any linear throttle progression from notch 1 up, when the throttle lever reaches notch 8, the system will go into constant acceleration rate mode, accelerating at a rate programmed into the control system for that particular railroad application.

After this first application into notch 8, any time the throttle is pulled back to notch 7 and then returned to notch 8, the notch 8 position will be a power setting and not a constant acceleration rate setting.

Optionally the throttle control system can allow setting notch 8 to back to acceleration rate control by sensing a rapid advanced over two notches, from notch 6 to notch 8 in under a certain time, possibly half a second. In this operational system, the engineer can bring the system into notch 8 power setting mode by pulling back the throttle handle to notch 7, as in the previous version if he then goes to notch 8 again, the system will consider this a power setting of notch 8. As the engineer manipulates the throttle with the desire to control power, he can continuously move the throttle lever up and down with a certain time dwell between throttle settings. In this case the throttle can be moved up and down always controlling power. When the engineer desires to return to acceleration rate control at full throttle, the engineer moves the throttle lever from notch 6 straight to Notch 8 rapidly. As long as the time elapsed from notch 6 to notch 8 is less than the programmed dwell time setting, the control system will interpret this as the engineers request for acceleration rate control.

Mature commuter lines like the Caltrain Penisula with 21 stops in 48 miles, could use the ability to accelerate the train slightly faster gaining a possible 10 to 15 second per stop adding up to several minutes over the course of 21 stops. In a further embodiment for an advanced HCIB system it is proposed is to allow notches 3 thru 7 to also become rate control setting to use the additional power provided by a ZEBL and optimize the initial acceleration characteristics of the passenger train.

As long as the operator continues to advance the throttle in 1 to 2 second intervals, the HCIB will consider this a standard acceleration event and will adjust the power setting to ramp the locomotive up to a preset peak acceleration rate.

Proposed is to increase the acceleration rate in 0.10 m/sec^2 increments each second until a peak acceleration rate of 0.80 m/sec^2 is reached. With deceleration events not being predictable by the passengers, it is proposed to limit those to the existing standard 0.45 m/sec^2 (1 mph/sec) so that passengers are not surprised and stumble if they happen to be on the stairs when the engineer initiates a stop. Because the train can only achieve these higher acceleration rates at low speeds when leaving the station, it seems appropriate to accelerate at a slightly higher rate than the peak continuous deceleration rate. There should be no confusion among the passengers of when the train will be leaving the station as the doors would have just closed and an announcement just made. Also it will take at least 8 seconds to get to the peak acceleration rate and it will only be maintained for 10 seconds or so until the train becomes power limited.

If at any point the operator stops advancing the throttle, the system will either maintain its current speed or continue increasing the power output up to the requested notch setting. To reinitialize rate control throttle action the engineer only has to reduce the throttle one notch, increase it back within a second and then increase the next 2 notches at intervals of 1 or 2 seconds. Once achieving the third notch in this increasing throttle setting direction, the system will again convert to rate control and gradually increase acceleration to the appropriate peak value as the throttle reaches notch 8.

One of the benefits of this approach is ascending grades such as when leaving a train station lowered station for grade separation. With this acceleration ramping system the engineer will operate the locomotive controls in the same manner as a stop on level ground, and the HCIB system will automatically compensate for the uphill grade allowing the train to accelerate at the normal acceleration rate unless weather and track conditions reduce the rate with wheel slippage. In the Palo Alto grade separation project, going from a 1% grade to a 2% grade for the below ground station could reduce the cost from $1.0 Billion by half to $500 Million. This saving alone could almost pay for Caltrain to add ZEBL's to its existing fleet.

If a functional and thoroughly backwards compatible HCIB control system is implemented, it is possible that the APTA will not come up with a revised standard to accommodate train hybridization and integrate its control into the air brake system because that would eliminate the fully independent control redundancy of the air brake control system.

In a combined throttle and dynamic braking lever system as used in modern passenger locomotives, there are typically 8 detented notches of throttle power with the position closest to the engineer being notch 8 or full power, when the lever is pushed forward, it will travel thru 7 detents to notch 1 (approximately 5% power) and then the next detent forward puts it into idle. From here the lever can be moved to the right to put the dynamic brakes into setup mode. From this position the lever is moved forward to apply the dynamic brakes. The further forward the lever is moved the more dynamic braking force is applied until the lever is all the way forward away from the engineer against the lever stop. It is proposed that instead of proportionally controlling the amount of dynamic brake power, forward motion of the dynamic brake lever could set a certain deceleration rate. With the lever all the way forward representing full service braking rate, and the deceleration rate decreasing linearly to 0 as the dynamic lever is brought back to the setup/idle position. During initiation of rate controlled deceleration the deceleration rate will be limited by the traction motors ability to absorb the regenerative energy, but as the train speed drops the available braking force from the fraction motors will slow the train down at the set deceleration rate. As the speed continues to decrease the hybrid control system will start reducing the dynamic braking force to maintain this rated acceleration/deceleration.

Converting the dynamic brake lever from power control to rate control may seem like a significant control system change, but this would make the dynamic brake control behavior more like that of the locomotive air brake system.

In another embodiment the dynamic brake lever can be given 8 detent positions similar to the throttle lever. Each of these notches represent an increasing deceleration rate starting from the setup with no deceleration and increasing to full service stop braking at notch 8 of dynamic braking. This has the disadvantage of not being fully backwards compatible and requiring the modification of the throttle/DB brake lever assembly in both the locomotive and any of the Cab Cars.

If all the dynamic brake lever travel is used to set increasing fixed deceleration rate settings, the engineer may lose one feature of dynamic braking which is the ability to apply just enough dynamic braking to maintain constant speed such as when going down a grade.

An optional embodiment of the rate control concept of dynamic braking is to revise the setup position from a position where the dynamic brakes are not applied, but a setting where the rate of deceleration is zero. In this case the dynamic brake system will apply just the amount of dynamic braking needed to maintain speed. It will do this until the amount of dynamic braking needed is more than the dynamic brake system can absorb, at which point it would stay at its maximum dynamic brake capability and the train will no longer be able to maintain a constant speed. At this point the train engineer would need to use additional train air brakes. This behavior is similar to conventional power control based dynamic brakes.

Similar to the 'Notch 9' concept for throttle control and intermittent rate controlled acceleration, the same idea can be used for the dynamic brake control, with the dynamic brake handle having a spring loaded position just past the full dynamic brake control. The DB lever should still control power, but if the engineer wants rate controlled braking he will advance the dynamic brake control to full dynamic braking and then move it past that position against a spring. With the handle pushed against this spring, the hybrid control system will be in deceleration rate control, once the pressure on the handle is released, the handle will move back to standard dynamic brake control. Again if the engineer releases the input or moves the dynamic brake handle from full dynamic braking, the system will return to the rated power absorption for that dynamic brake handle position. Similar to the Notch 9 thottle embodiment, this also is not fully backwards compatible and would require modifications to the locomotive and cab car controls.

As in acceleration control it may be decided that under DB lever power control this deceleration control rate can be engauged without an additional control input position and switch, and would automatically be engauged when the dynamic brake handle was in the full dynamic brake position. The first part of the dynamic brake lever travel would control power and the last small amount of travel would indicate that rate control deceleration would be engauged. In this case there would be no spring to push the lever back.

Under the current APTA standard RP-E-014-99 for passenger locomotive blended brake control, the passenger locomotive braking system will automatically activate the dynamic brake system in the locomotive when the engineer applies the automatic air brake handle. When performing the blended brake function, the system will both actuate the dynamic brake system and reduce the amount of air braking so that the train achieves the constant rate of deceleration that the engineer has selected with the automatic brake lever position.

In one embodiment of the hybrid locomotive control system, a reverse blended brake system can be applied. In this mode the engineer will be controlling the trains rate of deceleration with the dynamic brake control lever and the hybrid control system will automatically reduce the amount of dynamic braking as the engineer starts to apply either the independent or automatic air brakes. This automatic reduction of dynamic braking force will happen even if the engineer leaves the dynamic brake lever in place.

The system can determine the need for dynamic brake force reduction in several ways. In the simplest case it will be monitoring wheel speed and the actual deceleration rate, and if the deceleration rate increases to a rate higher than requested with the dynamic brake lever, the hybrid control system will assume that air brakes are being applied and reduce the dynamic brake force in order to maintain the requested braking rate. In another embodiment, the hybrid control system could sense air brake system pressure and sense that as a new command from the engineer for a different deceleration rate. At that point the hybrid control system could change the amount of dynamic braking force so that this new deceleration rate is achieved.

In another embodiment it could blend both control algorithms so that it sensed both air brake pressure demand and wheel speed, and manipulated the dynamic brake force so that the train experienced a smooth transition from dynamic brake lever control to air brake control.

Any of these systems could be programmed so that the engineer did not have to move the dynamic brake lever until the locomotive was ready to accelerate again. As passenger locomotives typically combine the dynamic brake and throttle lever, the dynamic brake lever would have to be moved back through idle in order to accelerate the train. While stationary it is air brakes that hold the train.

This blended hybrid braking scheme could be used not just for passenger locomotives, but for any hybrid locomotive system including switcher locomotive.

One of the embodiment proposed for HCIB control during train hybridization for both switcher locomotives and passenger trains is conversion of the dynamic brake (DB) lever from power control to deceleration rate control. While this makes the control of dynamic brakes simpler for the engineer as the air brake control is also basically a deceleration rate control where the braking system once set applies a nearly constant force to the brake pads decelerating the train at a constant rate. While allowing the DB lever to become a rate control lever is better from a control system for the engineers use, it does pose one challenge.

Because the energy/velocity ratio of moving vehicles is not linear, but a function of the square of the velocity, the amount of power the dynamic brake system will need to absorb from the train to decelerate at a constant rate is not constant. In order for the engineer to optimize where he starts to slow down the train, he would need to know where to first engage the dynamic braking system and what deceleration rate to command. This would be a challenge without some kind of indicator that illustrates how much of the trains dynamic braking capacity the system is using.

In one embodiment the indicator could be a simple gauge with a rotating needle. The needle would start at the nominal '0' position to the left. As the dynamic brakes are applied and the system starts to convert kinetic train energy into recovered electrical energy the needle will move to the right indicating the magnitude of the amount of power the system is absorbing. The gauge will be calibrated so that when the system is recovering the optimum amount of power, the needle will be at the vertical position which is easily recognized by the engineer with just a glance over the gauge.

There are several instances where the gauge needle may move to the right past the vertical position. This could indicate that the system is adding some air brake capacity to achieve that braking rate. In early versions of the hybrid passenger train system it would likely indicate that the 'A' unit would be dissipating some energy into its dynamic braking grid once it has reached the limit of how much energy it could transfer to the 'B' unit through the cabling system.

Figure 1D:
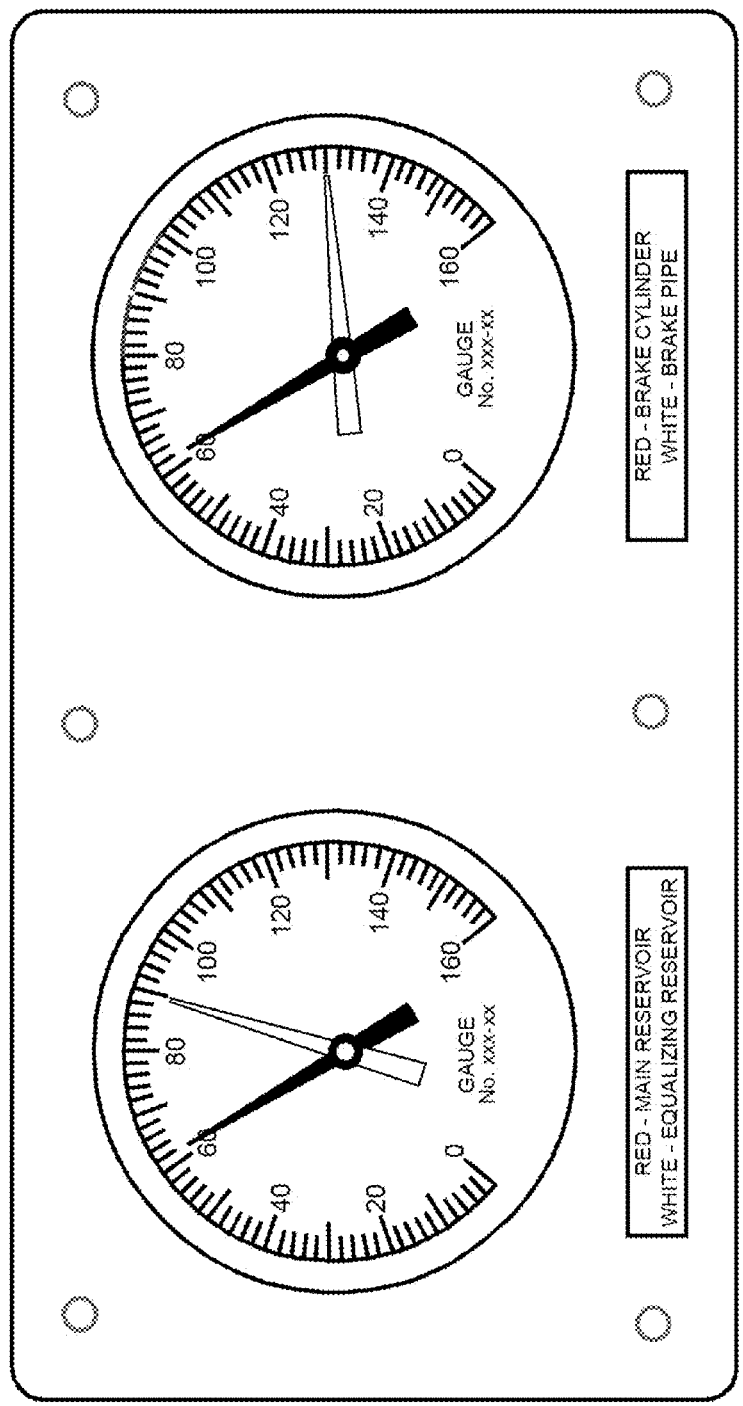
FIG. 1D: Prior Art drawing of locomotive air brake gauges

In the preferred embodiment of the hybrid indicator for passenger service, the indicator will mimic the behavior of the standard locomotive air brake pressure gauge with two needles. FIG. 1D is a prior art drawing of a pair of air brake gauges standard for locomotive in North America. Engineers typically set an 'air brake set' pressure to determine how fast the train slows down once the brakes are applied.

In the case of the hybrid indicator system the first needle could indicate the available deceleration rate that the control system predicts for the current train configuration. This value will change with locomotive speed, total weight and existing grade that the train is traveling on. This gives the engineer a target to set a braking rate with the dynamic braking level. In this case the engineer will start moving the DB lever forward observing the second needle. If the engineer has initiated deceleration at the appropriate time for the current route location and total train weight then he will not need to set the DB Braking rate more than the system will allow. If the engineer needs more braking then moving the lever further forward will command the control locomotive to start using its dynamic braking system dissipating some of the braking energy through the resistive brake grids. The goal is to not have the second needle (rate command) pass the first needle (available deceleration rate), this insures that the most deceleration energy was captured by the LESS. If the engineer needs additional braking for some reason, he can request more dynamic braking, but that additional braking energy will not be captured by the LESS. This system adds a third dual needle gauge to the control system that is easy to interpret with just a glance and similar to existing displays. It could be manufactured with mechanical needles or on a digital display.

In order to determine what the available deceleration rate may be, a control algorithm could be applied that purposely drives one traction motor into wheel slip intermittently to determine the optimal regenerative braking rates. This information could be used to determine the hybrid system indicator display.

The second portion of the detailed description relates to the configurations of the Locomotive Energy Storage System (LESS)

FIG. 2A is an isometric view of a LESS 6 system. This system has five cabinet sections on each side of the locomotive with 3 vertical columns of UC Modules 22 in each cabinet section. Each cabinet section holds 3 columns of UC modules 22 for a total of 39 UC modules 22 per cabinet section and 390 UC modules 22 in this pictured installation. Each UC module 22 can contain up to 78 individual UC cells for a total of 30,420 UC cells in the LESS. If the UC cells are allowed to operate from 3.0 volts down to 1.0 volts, each cell is good for 3.33 Watt-hours for a system total of 100 kW-hrs. This size LESS 6 would absorb the stopping energy of a medium sized passenger train with 8 or 9 passenger cars stopping from 79 mph.

Above the rack sections is the horizontal duct 24, in this embodiment this single horizontal duct 24 supplies cooling air to all of the LESS 6 cabinet sections. Each vertical column of UC modules 22 has its own vertical duct 26 that distributes cooling air to the individual US modules 22 in the column. Vertical duct 26 is fed cooling air from horizontal duct 24.

FIG. 2B is a close up view showing some construction detail of the cabinet sections in LESS 6 with multiple pieces removed for clarity. Now visible is the pair of bus bars 32 behind each column of UC modules 22. This configuration of the UC storage system has 3 columns of UC modules 22 connected in series. This requires two intermediate bus bar jumpers 34 to connect neighboring pairs of bus bars as intermediate bus bars where all the UC modules 22 in one column are in parallel, but three columns are in series allowing 234 UC cells to be connected in series for a peak LESS system voltage of 701 volts DC. This voltage would be measured across the outer most bus bars 32 of the three UC module 22 columns in each cabinet section. In each cabinet section, the columns of UC modules 22 are separated from each other by a sheet steel wall 38 with UC module rack slides 36 holding up each UC module 22. In this embodiment the sheet steel walls are actually two sheets separated by rack side sheet stiffeners which give added rigidity with lighter and thinner sheets. This wall could have single or double sheets and may or may not need the stiffener depending on the design. The UC module 22 is installed by sliding it into the rack section on top of the UC module rack slides 36. In the last few inches of its travel it engauges the UC module electrical contacts 30 mounted to the bus bar. The UC module 22 slides in until it is stopped by the front face plate 48 contacting the edge of the sheet steel sidewall 38. At that point two UC module retention bolts are threaded through front face plate 48 into mounting boss 40 to hold the module in place.

Visible in the figure are the UC module air supply ports 28 on the vertical duct 26.

The bus bars are surrounded by optional plastic isolators 33 to protect them from conductive debris falling on them and shorting out to the wall. The plastic isolators 33 can also help prevent the high voltage from arching to ground when moisture and or water may be present.

In this embodiment, there are three columns of UC modules 22 in series from one rack section. In practice it could be any number of UC module 22 columns in series and they can be from more than one cabinet section.

FIG. 3A is a top view and FIG. 3B is a cross section side view of UC Module 22. The UC Module has a UC Module lid 41 and a UC module main housing 44 that contain the UC cells 61. At the left end of the UC module is an air supply gasket 43 that forms a seal between the UC Module main housing 44 and the vertical duct 26 from FIG. 1A and FIG. 2. Also at this end are two protruding sections 42 of the UC module main housing that provide high voltage isolation for where UC module 22 engauges with contact 30. The UC Module electrical contacts 30 from FIG. 2B will slide into these protruding sections 42 and they will then be electrically isolated from most debris that can end up in the rack cabinet areas.

FIG. 3C is a left and FIG. 3D is a right end close up cross section of FIG. 3B. On the left end is the gasket 43 and the cooling air inlet 45. This is where the cooling air enters the UC module from the UC Module air supply port 28 on the vertical duct 26. Once the air enters the module it flows up into the cooling air plenum 49. The cooling air plenum 49 is a cavity formed between the UC module lid 41 and the UC module main housing 44. The only way for cooling air to leave this cavity is to pass around the outer surface of a UC cell 61. An optional UC cell cooling sleeve 60 will form a small passage way around the UC cell 61, by adding this UC cell cooling sleeve 60 it should be possible to control the cavity size around the UC cells 61 more precisely or allow the UC module main housing 44 to also hold different size UC cells 61, possibly battery cells instead of UC cells 61 in future mixed ultra capacitor and battery systems.

The benefit of a more precise cooling air passage around the UC cell 61 is that it can be smaller which will reduce the amount of air that needs to be ducted to each UC module 22. With 390 or more UC modules 22, reducing the volume of airflow needed is important. Because the UC module main housing 44 has to structurally support the weight of the UC module it should be made of a rigid material. The independent UC cell cooling sleeves 60 construction allows the UC cell cooling sleeves to be made of a more pliable material than the housing which also reduces the accuracy demands and therefore cost on the diameter of UC cell 61 during manufacture.

The UC module lid 41 is bolted down and seals to the UC module main housing 44. The UC module lid has cast in plastic UC cell hold down bosses 46 that hold the UC cells 61 in place. This keeps the UC cells 61 from moving up and down.

On the right side of the UC module is the front retaining panel 48. In this embodiment it is a low cost stamped metal plate that bolts to the UC module main housing 44. Behind the front retaining panel is a serviceable cavity 47 for control electronics. In this area could be the control electronics for the UC module 22. This area is serviceable without removing the module from the rack section by unbolting the front retaining panel 48 from the UC module 22 main housing 44. The front retaining panel 48 is also where a connector plug could be installed that brings in low voltage power and communicates with the overall control system for all of the UC modules 22 in the LESS 6 system. This low voltage and communications plug could also be designed to plug in on the left side of the module 22; it would be connected automatically when the UC module 22 is slid into the rack section of LESS 6. Also in the left side is a cavity 50 for an optional DC contactor that will disconnect this UC module 22 from one or both bus bars 32 if the UC module 22 internal control system decides this is needed. This could be because of a bad cell or a fault in the UC module controller. In most instances the UC module controller will be connected to each electrical connecting strap between all of the UC cells 61. This will allow the UC module controller to monitor the cells for health and also to balance the UC cells.

The previously described cooling air passages around the UC cells do have one challenge. With 30,000 cells in an UC storage system, and a desire to give each cell its own air supply, all of these independent air passages will add up to a very large total area requiring not only a lot of air flow, but large supply ducts.

If the duct system proves to be restrictive it will be difficult to insure the pressure supply to each UC module 22 will be the same and that can cause some UC cells 61 to not get as much cooling air. If some UC cells 61 operate warmer they will fail at a faster rate, and it's possible the system will have to operate at a lower peak UC cell 61 voltage which will reduce the amount of energy storage per UC cell 61. The amount of energy storage in a UC cell 61 is a function of the square of the voltage. If the operating voltage of the UC cells 61 is reduced 10% from 3.0 volts to 2.7 volts, the energy capacity per UC cell 61 drops 21%.

One simple solution to the cooling air flow management challenge is to create spiral shaped air channels around the UC cells 61. These would appear similar to threads in a nut. Compared to a traditional annular radial gap with the air flowing in an axial direction along the length of the UC cell 61 cylindrical case, this spiral shape could reduce the cross section cooling flow area around each cell by a factor of 10. It would also lengthen the air flow passage by a similar factor. The combination of a smaller cross section and a longer passage can increase the pressure drop across the airflow passage by an order of magnitude. This higher pressure drop across the UC cell 61 passage insures that most of the total system pressure differential from the supply fan is consumed across the UC cell 61 and not in the ducting system. This significantly decreases the effects of pressure loss in the ducting system and reduces the variation of air flow around the individual UC cells 61 throughout the 100 or more UC cell module 22 assemblies in a locomotive.

Another effect is that each increment of cooling air as it passes through the channel around a single UC cell will have more time to extract heat from the cell. This allows less total air mass to capture more heat. This reduced air mass requirement combined with a reduced sensitivity to supply duct pressure loss significantly reduces the required size of the air supply ducting. This reduced ducting requirement allows packaging more UC cells in the same volume, at the same time it allows UC cell 61 operation at a higher peak voltage and corresponding energy density.

The spiral groove could be molded into the pocket of a UC module main housing 44, or it could be incorporated into a spiral sleeve. This spiral sleeve could be designed in such a way that it replaces the typical plastic coating on the UC cell. The outer metal case on a typical UC cell 61 is connected directly to one of the electrodes which will be conducting heat away from the inside of the UC cell.

The benefit of incorporating the spiral groove into the housing pocket for the UC cells 61 is less parts to manufacture and possibly tighter packaging. The downside is expensive tooling to incorporate the spiral groove and the tighter tolerance the UC cells may have to be manufactured with in order for the spiral groove to function properly. The tooling would also be expensive to modify if the UC cell size changes.

Incorporating the spiral groove into a sleeve allows a more flexible material to be used that will accommodate less manufacturing precision on the UC cell outside diameter. The cost of tooling for making the spiral sleeve is much less so the same UC module main housing could accommodate different size UC cells with only the tooling for the spiral sleeve having to change.

FIG. 4A is an illustration of a spiral sleeve 60' and a UC Cell 61'. The UC cell 61' would slide into the spiral sleeve 60' for installation into the UC Module housing 22. Pressurized air would enter into the spiral groove 62 at the top of the spiral sleeve 60' and the UC cell 61' and wind its way through the spiral groove 62 until it reached the bottom of the spiral sleeve 60' and UC cell 61'. At this point it will have accumulated some heat from the UC cell 61' outer surface and will exit out the bottom of the spiral sleeve 60'.

Using inexpensive braided ground strap as both the conductor to connect to the UC cells and as the contact point with the bus bar. It eliminates the challenge of single hard contacts with alignment issues. Minimizes the parts count and labor to assemble, is easy and economical to replace contact wear items at overhaul periods. Reduces need for critical bus bar and contactor alignment. Large number of contact points on flexible braid will alleviate vibration issues with extended usage.

Figure 5:
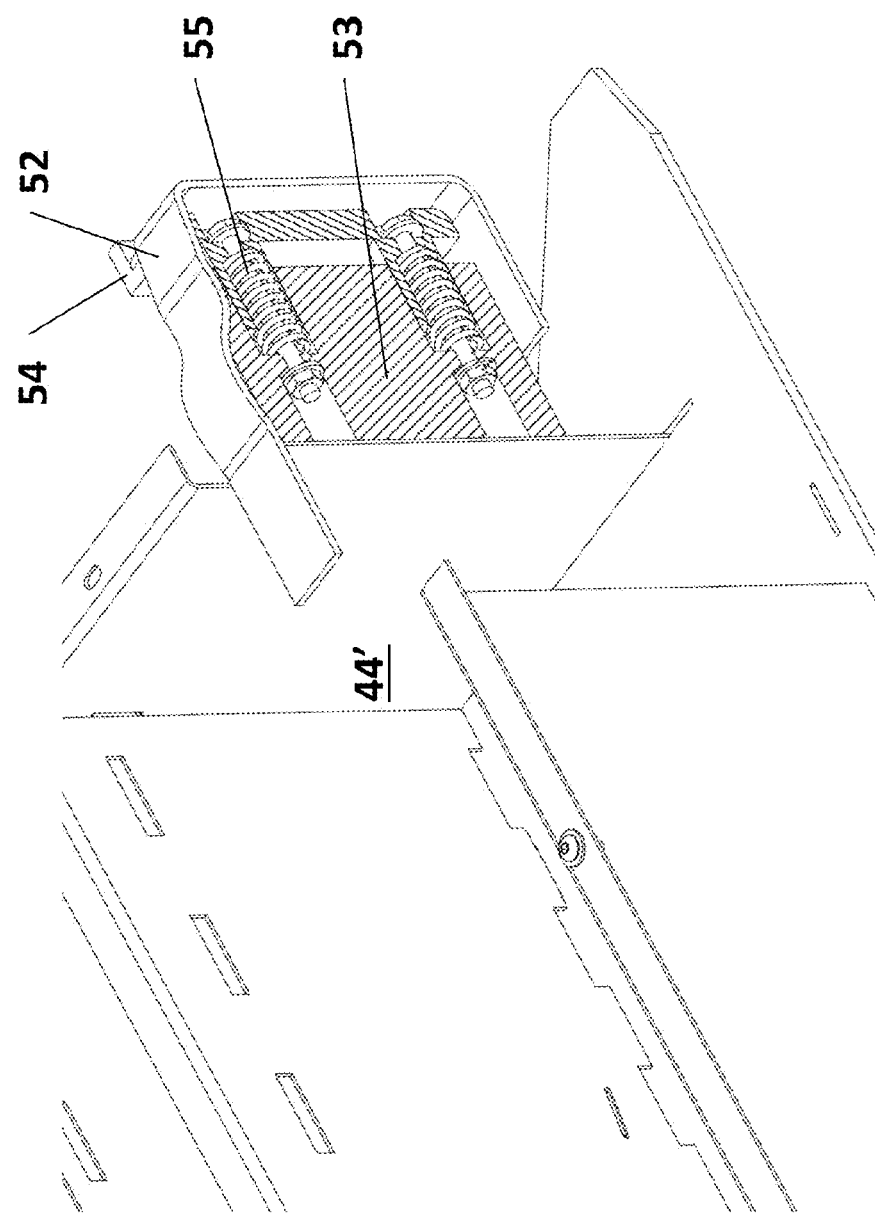
FIG. 5: Partial Cross Section of a string loaded contact assembly using braided wire

FIG. 5 illustrates this economical and robust high capacity contact system. Module case 44' is cut away for clarity of the contact housing parts. In addition fixed block 53 and moving pad 54 are sectioned so that the internal springs 55 are visible. Module cas When module case 44' is fully inserted into the LESS 6, springs 55 will push movable pad 54 and the braided contact strap 52 against bus bar 32. One end of braided contact strap 52 would be electrically connected to the string of battery or ultra cap cells in the module.

The braided strap 52 offers the benefit of flexibility and hundreds of small contact points where it would be pushed against bus bar 32. In the preferred embodiment both the braided strap 52 and bus bar 32 would be plated for corrosion resistance.

The third portion of the detailed description relates to the use of the existing passenger train HEP cables for additional hybridized train performance There will be a transition in the passenger rail industry with an effort to make new systems backwards compatible and integrate these new more powerful systems in such a way that they can be used in trains that have standard conventional locomotives or conventional locomotives with minimal modifications.

Because of the frequent start and stop nature of commuter passenger trains, it is likely that these will be hybridized as the technology of power electronics and electric energy storage matures as it is currently expanding in hybrid transit bus fleets. These energy storage systems will require more space than is available on current locomotives, and it is likely these systems will place the energy storage systems in an additional rail vehicle. The future Hybrid locomotives are likely to have an 'A' unit locomotive with an operators compartment and fossil fueled engines that provide the energy consumed during the time the locomotive is in service. Attached to the 'A' unit will be a 'B' unit locomotive that will house the hybrid energy storage system. This 'B' unit will also have its own set of powered traction motors for accelerating and decelerating the train. When fully refined it is likely that there will be a common DC bus between the 'A' unit and the 'B' unit that allows the traction motors from both rail vehicles to be used both to decelerate and accelerate the train by moving energy in and out of the 'B' unit energy storage system.

Implementation of this common DC bus would require major modifications of the 'A' unit locomotives and it is likely that early versions of hybrid locomotives would have to use only the 'B' unit traction motors to charge the energy storage system during deceleration and then use that energy only in the 'B' unit traction motors help accelerate the train.

It is common in the art of passenger trains that there will be a set of HEP power cables that transfer A/C power from the locomotive to the passenger coaches. In the case of adding a B unit to the train, there will need to be high power trainlines passing through the B unit to transfer the hotel power from the lead locomotive to the trailing passenger cars.

One issue with an A and B consist with no common DC bus is that the only way to get energy into the LESS is by having it charge as the train slows down. In this case when a hybrid train goes to make its first start of the day the energy storage system may not be at full capacity. At other times the engineer may use more or less air brake during a stop. In any instance the train starts to accelerate and the HESS is not at full capacity, the train's performance may be different from run to run. In one embodiment of a B unit locomotive, there will be a control and power electronics system on the B unit that can absorb some of the HEP power being transferred through the B unit HEP trainlines. This would allow the HESS to be charged by the HEP generator system resulting in consistent operation of the train even at the first run after the train has been sitting for a length of time and the energy storage system has been depleted.

This could also allow the hybrid B unit to provide most of the propulsion and braking when the train is only traveling a short distance from station to station. In this case a stop from a lower speed will not fully recharge the HESS, and the B unit power electronics can take excess capacity from the HEP generator to add more energy to the HESS. In a case of repeated short stops, the main engine may provide minimal if any propulsion as most of the energy used to accelerate the train to these lower speeds is recuperated with the B unit and any lost energy is made up from the HEP system. Using the HEP engine at full capacity is more fuel efficient and less pollution emitting than using the main locomotive engine at low loads.

There will be a limit to how rapidly a train can be decelerated by only using the traction motors in the B unit to slow down the train. In some cases the engineer may request more dynamic braking than can be done with only the B unit traction motors, in this instance the control system will augment that braking effort by engaging the dynamic brakes of the A unit. In another embodiment, all or some of the DC power that would be dissipated in the dynamic brake grid of the A unit could be transferred to the B unit.

This would require some power electronics to be installed into the A unit to divert the power from the resistive dynamic braking grid to the B unit HESS. In one embodiment this could be accomplished by placing a DC chopper circuit between the dynamic brake grid and the A unit traction motors that are generating the DC power. Another piece of power electronics will control the flow of this energy to the B unit HESS. When the HESS is able to absorb the power from the A unit then the DC chopper would not be active and all the A unit dynamic braking power will be transferred to the HESS. Once the A unit dynamic braking power being produced exceeds the power that the HESS can absorb, the control system will start increasing the pulse width of the DC chopper allowing the excess power to be dissipated in the dynamic brake grid.

This transfer of power from the A unit to the B unit is not a conventional 'Common DC bus' and does not require modern power electronics between the A unit main alternator and traction motors, the existing mechanical DC contactors that control the traction motors can remain the same. The only power electronics needed is the system that controls power flow to the dynamic brake grid and that allows diverting the Dynamic braking energy to the B unit. This power could be transferred in limited quantity through the existing HEP cables or transferred in dedicated new cables between the A and B unit.

As the amount of power that can be absorbed during dynamic braking is increased, it allows the trains to be slowed down from higher speeds at higher rates of deceleration without the use of airbrakes. Even if it results in less recovered energy when some of the power is dissipated in the A unit dynamic brake grid, it is beneficial to allow the engineer that extra dynamic brake control range to better control the deceleration rate without the use of air brakes.

The implementation of locomotive hybridization has been proposed in three steps, first as an independent B unit connected to a standard passenger locomotive. Then as B unit that can also absorb a limited amount of power from the from the A unit during braking with some minor power electronics added to the A unit, and then a fully integrated Hybrid locomotive system with a common DC bus between the A and B unit where all the traction motors of both the A and B unit can add to or use energy from the HESS.

It is expected that energy storage capacity will continue to grow. As it does, more and more space that was needed to carry enough storage to absorb a locomotive stop will be freed up. As the UC cell racking system would also accommodate battery cells, the LESS will be able to store more and more energy and at some point will have enough storage for partial zero miles operation.

Another trend in passenger locomotives is using shore power during extended layovers so that the fossil fuel powered HEP generator can be turned off for reduced fuel consumption, wear, emissions and noise.

From the same power electronics package that could take excess HEP energy into the LESS, this same system could allow the LESS to be charged by way side power in a similar fashion to a plugin hybrid car or truck.

Previous provisions applications have described various systems of using excess HEP power to boost the amount of acceleration available to the locomotive and also as a backup propulsion system. These systems had a secondary benefit of using additional power from the HEP generator to increase the exhaust gas temperatures of the HEP powerplant in order to prevent the need for active regeneration of a diesel particulate filter.

The addition of these systems on the control locomotive prove to be a challenge as a typical passenger locomotive has little extra room for the needed additional power electronics and integrating this system into the control locomotive may complicate the existing mechanical switch gear that connects the main DC generator to the traction motors. Also there should be an isolation transformer installed and a 500 kW transformer mounted off the centerline of the locomotive will become a weight and balance issue.

Also discussed in several previous provisional patents was a system of using HEP power passing through the ZEBL trainlines as a source of power to precharge the ZEBL LESS or make up for lost power during short start/stop segments.

An expansion on this idea that solves the issue of putting additional power electronics and an isolation transformer in the control locomotive is to use the ZEBL as a backup locomotive for limp home capability.

Further this same hardware and a special control mode can be used to have the ZEBL provide a backup HEP power supply if the main HEP system should fail.

The HCIB system in the control locomotive could have a 'prime engine' limp home mode that when activated, only the ZEBL would be used to accelerate the train. The HCIB would apply as much power as is available in the LESS to accelerate the train, all the while the ZEBL HEP power electronics would be extracting as much power as possible from the HEP trainline to add to the train's acceleration rate or recharge the LESS after stopping. In this way, the HEP engine could be used to get the train to the next station, siding or the end of the line in a limp home mode at a slightly slower pace due to the reduced power.

Additionally, if the ZEBL HEP power electronics are built to be also generate HEP AC power from the LESS, the HCIB could be put into a 'HEP engine' limp home mode. In this mode, the train can continue in service after a HEP generator engine failure, but at a reduced pace. In this mode, the HCIB system would use less of the LESS energy for propulsion and reserve some of it for providing HEP power when the train is stationary. Once under way, the HCIB could control the ZEBL traction motors in such a fashion that they are absorbing power and adding energy to the LESS system while the prime engine is propelling the train. In this way the prime engine in the control locomotive is providing the HEP power, but there have been no modifications to the control locomotive electrical system in order to do this.

Both of these limp home functions can be accomplished with one set of power electronics if they are bidirectional. A device called an active front end (AFE) is a common device used in modern motor drive systems. In one direction it takes AC power and rectifies it into a controlled DC output. In the opposite direction it will take DC power and invert it into the appropriate frequency and voltage AC power.

It should be noted that various changes and modifications to the presently preferred embodiments described herein will be apparent to those skilled in the art. Such changes and modifications may be made without departing from the spirit and scope of the present invention and without diminishing its attendant advantages.

I claim:

1. A locomotive consist comprising:
a first locomotive unit that receives a power command from one of a throttle signal and a dynamic brake signal from MU trainlines and that includes a prime engine electrically connected to one or more first unit traction motors that provide tractive power and to an electric resistance grid electrically connected to the one or more first unit traction motors that provide dynamic braking power, wherein the first locomotive unit is a diesel electric locomotive;
a second locomotive unit with an energy storage system electrically connected to one or more second unit traction motors, wherein the second locomotive unit has a dynamic braking system that decelerates the consist by electrically transferring energy from the one or more second unit traction motors to the energy storage system, and wherein the second locomotive unit provides tractive power to the consist by electrically transferring energy from the energy storage system to the one or more second unit traction motors; and
a hybrid control system on the first locomotive unit that intercepts the throttle signal or the dynamic brake signal from the MU trainlines, calculates first and second alternate power commands for the first and second locomotive units, respectively, that when added together equal one of the power command and the dynamic brake signal received on the MU trainlines, communicates the first power command to the first locomotive prime engine or dynamic braking system, and communicates the second power command to the second locomotive unit;
wherein the hybrid control system includes a lever that moves between a throttle lever position and a dynamic brake lever position;
wherein the throttle lever position corresponds to one of a plurality of notches of throttle power including lower notch positions and a highest notch position;
wherein the lower notch positions are constant power settings; and
wherein the highest notch position corresponds to a constant acceleration rate setting.

2. The system of claim 1, wherein the highest notch position corresponds to a power rate setting when the lever is moved back and forth between the highest notch position and a second-highest notch position with a specified time delay between settings; and
wherein the highest notch position corresponds to a constant acceleration rate setting when the lever is moved into the highest notch position following a linear throttle progression with less than the specified time delay between notch settings.

3. The system of claim 1 wherein the highest notch position corresponds to a constant acceleration rate setting when the lever is moved from a third-highest notch position to the highest notch position within about 0.5 second; and
wherein the highest notch position corresponds to an acceleration rate setting when the lever is moved into the highest notch position following a linear throttle progression.

4. The system of claim 1, wherein the dynamic brake lever position provides a variable 0-72 volt signal that indicates a braking power command, and wherein the hybrid control system intercepts the variable 0-72volt signal of the braking power command and issues a revised 0-72 volt signal that commands a specific rate of train deceleration.

5. The system of claim 4 wherein a setup position of the dynamic brake lever position corresponds to a deceleration rate of zero.

6. The system of claim 4 wherein the first locomotive unit further receives an air brake force command from the air brake levers, and wherein the hybrid control system automatically reduces the dynamic braking force in order to maintain the specific rate of train deceleration.

7. The system of claim 1 further comprising head end power (HEP) cable trainlines that transfer hotel power electrically to one or more passenger cars.

8. The system of claim 7 wherein the energy storage system is charged from a wayside power source through the one or more HEP cable trainlines.

9. The system of claim 7 wherein where the first locomotive is a passenger locomotive capable of generating hotel power to be transferred electrically through HEP cable trainlines to one or more passenger cars.

10. The system of claim 9 wherein the first locomotive has a second power source used to independently generate the HEP power.

11. The system of claim 10, further comprising an independent HEP power source, and wherein the hybrid control interface box is programmed with special mode to charge the energy storage system with power generated from the HEP engine as a way to move the consist when the prime engine has failed.

12. The system of claim 9 wherein where the second power source is one of a fuel cell and energy storage batteries.

13. The system of claim 9 wherein the hybrid control interface box is programmed with a control mode so that the energy storage system provides hotel power to the HEP cables when one of a hotel engine, a generator, and a plurality of inverters on the first locomotive has failed.

14. The system of claim 13, wherein energy stored in the energy storage system will no longer be used for propulsion and when the locomotive is in motion, the second locomotive will absorb a portion of the prime engine power by dynamic braking to be stored for use as HEP power.

15. The system of claim 1 further comprising a hybrid indicator system connected to the hybrid control system that has a first indication of the available deceleration rate in real time and second indication of the deceleration rate commanded by the current dynamic brake lever signal on the MU trainlines.

16. The system of claim 15 wherein the hybrid indicator system uses first and second rotating needle pointers in the same arc to indicate the available and commanded deceleration rate, respectively.

17. The system of claim 1 further comprising head end power (HEP) cable trainlines that transfer the dynamic braking power from the first locomotive to the second locomotive unit.

18. The system of claim 17 wherein the dynamic braking power from the first locomotive is transferred to the second locomotive unit by controlling power electronics and through existing HEP cables between the first and second locomotives.

19. A locomotive consist comprising:
a first locomotive unit that receives a power command from one of a throttle signal and a dynamic brake signal from MU trainlines and that includes a prime engine electrically connected to one or more first unit traction motors that provide tractive power and to an electric resistance grid electrically connected to the one or more first unit traction motors that provide dynamic braking power, wherein the first locomotive unit is a diesel electric locomotive;
a second locomotive unit with an energy storage system electrically connected to one or more second unit traction motors, wherein the second locomotive unit has a dynamic braking system that decelerates the consist by electrically transferring energy from the one or more second unit traction motors to the energy storage system, and wherein the second locomotive unit provides tractive power to the consist by electrically transferring energy from the energy storage system to the one or more second unit traction motors; and
a hybrid control system on the first locomotive unit that intercepts the throttle signal or the dynamic brake signal from the MU trainlines, calculates first and second alternate power commands for the first and second locomotive units, respectively, that when added together equal one of the power command and the dynamic brake signal received on the MU trainlines, communicates the first power command to the first locomotive prime engine or dynamic braking system, and communicates the second power command to the second locomotive unit;
wherein the hybrid control system includes a lever that moves between a throttle lever position and a dynamic brake lever position;
wherein the dynamic brake lever position corresponds to a command to provide a specified deceleration rate.

20. The system of claim 17 wherein the dynamic braking power from the first locomotive is transferred to the second locomotive unit by controlling power electronics and through dedicated new cables between the first and second locomotives.

* * * * *